United States Patent
Andou et al.

(10) Patent No.: US 9,002,562 B2
(45) Date of Patent: Apr. 7, 2015

(54) VEHICLE DRIVING SYSTEM

(71) Applicant: Honda Motor Co., Ltd., Tokyo (JP)

(72) Inventors: Satoshi Andou, Utsunomiya (JP); Masatoshi Noguchi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/056,874

(22) Filed: Oct. 17, 2013

(65) Prior Publication Data
US 2014/0114520 A1 Apr. 24, 2014

(30) Foreign Application Priority Data
Oct. 18, 2012 (JP) .................. 2012-230844

(51) Int. Cl.
| | | |
|---|---|---|
| B60L 11/00 | (2006.01) | |
| G06F 17/00 | (2006.01) | |
| B60W 10/00 | (2006.01) | |
| B60K 6/48 | (2007.10) | |
| B60K 6/52 | (2007.10) | |
| B60K 23/08 | (2006.01) | |
| B60K 28/16 | (2006.01) | |
| B60W 10/08 | (2006.01) | |
| B60W 20/00 | (2006.01) | |
| B60W 30/18 | (2012.01) | |

(52) U.S. Cl.
CPC ... *B60K 6/48* (2013.01); *B60K 6/52* (2013.01); *B60K 23/0808* (2013.01); *B60K 28/165* (2013.01); *B60W 10/08* (2013.01); *B60W 20/00* (2013.01); *B60W 30/18172* (2013.01); *Y10S 903/902* (2013.01); *B60W 2720/30* (2013.01); *Y02T 10/7077* (2013.01); *Y02T 10/6221* (2013.01); *Y02T 10/6265* (2013.01)

(58) Field of Classification Search
USPC .................. 701/22, 69, 89–90, 82; 180/65.1, 180/65.265
See application file for complete search history.

(56) References Cited

U.S. PATENT DOCUMENTS

| | | | | |
|---|---|---|---|---|
| 5,033,573 | A * | 7/1991 | Hrovat ......................... 180/197 |
| 5,041,978 | A * | 8/1991 | Nakayama et al. ............. 701/84 |
| 5,348,517 | A * | 9/1994 | Dick ............................. 475/210 |
| 5,527,225 | A * | 6/1996 | Dick .............................. 474/12 |
| 6,553,297 | B2 * | 4/2003 | Tashiro et al. .................. 701/48 |
| 7,520,351 | B2 * | 4/2009 | Uchisasai et al. ......... 180/65.245 |
| 8,244,443 | B2 * | 8/2012 | Oshima et al. .................. 701/71 |
| 2009/0281704 | A1 * | 11/2009 | Otake ............................. 701/96 |

FOREIGN PATENT DOCUMENTS

JP  2008-120119  5/2008

\* cited by examiner

*Primary Examiner* — Yonel Beaulieu
(74) *Attorney, Agent, or Firm* — Charles Donald Stevens

(57) ABSTRACT

A vehicle driving system includes a slip detector that detects an occurrence of excess slipping; an additive/subtractive slip point calculator that time-discretely calculates an additive/subtractive slip point, which is an additive slip point or a subtractive slip point, on the basis detection or non-detection of an occurrence of excess slipping; a cumulative slip point calculator that sequentially calculates a cumulative slip point that is a cumulative sum of values of the additive/subtractive slip point; and a driving mode switcher that switches between a two-wheel driving mode and an all-wheel driving mode on the basis of the cumulative slip point. When excess slipping is detected, the additive/subtractive slip point calculator calculates the additive slip point on the basis of a driving force correlation value that correlates to a driving force a driving wheel for which the excess slipping has occurred.

20 Claims, 19 Drawing Sheets

VEHICLE DRIVING SYSTEM

CROSS REFERENCES TO RELATED APPLICATIONS

The present application claims priority under 35 U.S.C. §119 to Japanese Patent Application No. 2012-230844, filed Oct. 18, 2012, entitled "Vehicle Driving System." The contents of this application are incorporated herein by reference in their entirety.

BACKGROUND

The present disclosure relates to a vehicle driving system. In particular, the present disclosure relates to a vehicle driving system that switches a driving mode of a vehicle when slipping occurs.

To date, technologies have been proposed for switching a drive mode of a vehicle from a two-wheel drive mode (hereinafter, referred to as "2WD") to an all-wheel drive mode (hereinafter, referred to as "AWD") when a front wheel or a rear wheel slips and then continuing AWD for a predetermined all-wheel drive duration after a time at which the wheel stopped slipping. Such technologies can include calculating a slipping amount (the amount or the degree of slipping) on the basis of the difference between the front wheel velocity and the rear wheel velocity and determining a period over which an all-wheel drive duration is to be extended in accordance with the cumulative sum of slipping amounts each calculated when slipping occurred.

However, even if the slipping amounts are the same, the road conditions may differ considerably depending on the magnitudes of driving forces when slipping occurred. Therefore, by simply switching the driving mode of the vehicle in accordance with the cumulative sum of slipping amounts, it may be difficult to appropriately switch the driving mode of a vehicle. To be specific, there is a possibility that the driving mode may be switched from AWD to 2WD when the road surface has a low coefficient of friction ($\mu$). In this case, vehicle stability may decrease. Moreover, there is a possibility that the driving mode may be switched from 2WD to AWD and AWD may be maintained for an unnecessarily long period even when the road has a high coefficient of friction ($\mu$) and AWD is not necessary. In this case, the fuel economy and the economy of consumption of electricity (hereinafter, referred to as "driving efficiency") may decrease.

SUMMARY

In one aspect, a vehicle driving system can include a first driving device that drives a first driving wheel that is one of a front wheel and a rear wheel of a vehicle; a second driving device that drives a second driving wheel that is the other of the front wheel and the rear wheel of the vehicle; and a controller that controls the first driving device and the second driving device so as to control a driving mode of the first driving wheel and the second driving wheel.

The controller can include a slip detector that detects an occurrence of excess slipping of the first driving wheel or the second driving wheel, the excess slipping being slipping of more than a predetermined amount. The controller can include an additive/subtractive slip point calculator unit that time-discretely calculates an additive/subtractive slip point on the basis of detection or non-detection of an occurrence of the excess slipping by the slip detector, the additive/subtractive slip point being an additive slip point or a subtractive slip point.

The controller can include a cumulative slip point calculator that sequentially calculates a cumulative slip point that is a cumulative sum of values of the additive/subtractive slip point. The controller can include a driving mode switcher that switches between a two-wheel driving mode and an all-wheel driving mode on the basis of the cumulative slip point, the two-wheel driving mode being a driving mode in which only one of the first driving wheel and the second driving wheel is used to drive the vehicle, the all-wheel driving mode being a driving mode in which both the first driving wheel and the second driving wheel are used to drive the vehicle.

When the slip detector detects the occurrence of the excess slipping, the additive/subtractive slip point calculator calculates the additive slip point on the basis of a driving force correlation value that correlates to a driving force of a driving wheel for which the excess slipping has occurred.

The driving mode switcher can switch to the two-wheel driving mode when the cumulative slip point is below a first threshold and to the all-wheel driving mode when the cumulative slip point is at or above the first threshold. The driving mode switcher can prohibit switching to the two-wheel driving mode when the cumulative slip point is at or above a first threshold.

In a case where the front wheel is the first driving wheel and the rear wheel is the second driving wheel, the driving mode switcher can switch, on the basis of the cumulative slip point, among a front-wheel driving mode in which only the front wheel is used to drive the vehicle, a rear-wheel driving mode in which only the rear wheel is used to drive the vehicle, and an all-wheel driving mode in which both the front wheel and the rear wheel are used to drive the vehicle. The driving mode switcher can switch to the rear-wheel driving mode when the cumulative slip point is below a second threshold, to the front-wheel driving modes when the cumulative slip point is at or above the second threshold, and to the all-wheel driving mode when the cumulative slip point is at or above a first threshold that is greater than the second threshold.

In a case where the front wheel is the first driving wheel and the rear wheel is the second driving wheel, the driving mode switcher can switch, on the basis of the cumulative slip point, among a front-wheel driving mode in which only the front wheel is used to drive the vehicle, a rear-wheel driving mode in which only the rear wheel is used to drive the vehicle, and an all-wheel driving mode in which both the front wheel and the rear wheel are used to drive the vehicle. The driving mode switcher can prohibit switching to the front-wheel driving mode and the rear-wheel driving mode when the cumulative slip point is at or above the first threshold, and can prohibit switching to the rear-wheel driving mode when the cumulative slip point is at or above a second threshold that is less than the first threshold.

The first driving device can include an internal combustion engine as a drive source. The second driving device can include only an electric motor as a drive source. In another aspect, a vehicle driving system can include a first driving device that drives a first driving wheel that is one of a front wheel and a rear wheel of a vehicle; a second driving device that drives a second driving wheel that is the other of the front wheel and the rear wheel of the vehicle; and a controller that controls the first driving device and the second driving device so as to control a driving mode of the first driving wheel and the second driving wheel.

The controller can include a slip detector that detects the occurrence of excess slipping of the first driving wheel or the second driving wheel, the excess slipping being slipping of more than a predetermined amount. The controller can include an additive slip point calculator that time-discretely calculates an additive slip point on the basis of detection of the occurrence of the excess slipping by the slip detector. The controller can include a cumulative slip point calculator that sequentially calculates a cumulative slip point that is a cumulative sum of values of the additive slip point. The controller can include a driving mode switcher that switches between a two-wheel driving mode and an all-wheel driving mode on the basis of the cumulative slip point, the two-wheel driving mode being a driving mode in which only one of the first driving wheel and the second driving wheel is used to drive the vehicle, the all-wheel driving mode being a driving mode in which both the first driving wheel and the second driving wheel are used to drive the vehicle.

When the slip detector detects an occurrence of the excess slipping, the additive slip point calculator calculates the additive slip point on the basis of a driving force correlation value that correlates to a driving force of a driving wheel for which the excess slipping has occurred.

The driving mode switcher can switch to the two-wheel driving mode when the cumulative slip point is below a first threshold and to the all-wheel driving mode when the cumulative slip point is at or above the first threshold. The driving mode switcher can prohibit switching to the two-wheel driving mode when the cumulative slip point is at or above a first threshold.

In a case where the front wheel is the first driving wheel and the rear wheel is the second driving wheel, the driving mode switcher can switch, on the basis of the cumulative slip point, among a front-wheel driving mode in which only the front wheel is used to drive the vehicle, a rear-wheel driving mode in which only the rear wheel is used to drive the vehicle, and an all-wheel driving mode in which both the front wheel and the rear wheel are used to drive the vehicle. The driving mode switcher can switch to the rear-wheel driving mode when the cumulative slip point is below a second threshold, to the front-wheel driving modes when the cumulative slip point is at or above the second threshold, and to the all-wheel driving mode when the cumulative slip point is at or above a first threshold that is greater than the second threshold.

In a case where the front wheel is the first driving wheel and the rear wheel is the second driving wheel, the driving mode switcher can switch, on the basis of the cumulative slip point, among a front-wheel driving mode in which only the front wheel is used to drive the vehicle, a rear-wheel driving mode in which only the rear wheel is used to drive the vehicle, and an all-wheel driving mode in which both the front wheel and the rear wheel are used to drive the vehicle. The driving mode switcher can prohibit switching to the front-wheel driving mode and the rear-wheel driving mode when the cumulative slip point is at or above the first threshold, and can prohibit switching to the rear-wheel driving mode when the cumulative slip point is at or above a second threshold that is less than the first threshold.

The first driving device can include an internal combustion engine as a drive source, and the second driving device can include an electric motor as a drive source.

In another aspect, a method of controlling a driving mode of a vehicle can include the steps of detecting a plurality of occurrences of excess slipping in a first driving wheel of a vehicle; calculating a plurality of additive/subtractive slip points; calculating a cumulative slipping point that is a sum of plurality of additive/subtractive slip points; and applying torque to a second driving wheel based on the cumulative slipping point.

The step of detecting a plurality of occurrences of excess slipping in a first driving wheel can include comparing a velocity of the first driving wheel to a velocity of another wheel on the vehicle. The first driving wheel can be one of a front and rear wheel of the vehicle and the second driving wheel can be the other of the front and rear wheel of the vehicle. The step of calculating each said additive/subtractive slip point on the basis of the detecting the occurrence of the excess slipping in the driving wheel can include measuring a driving force and a slip duration.

The step of measuring a driving force can include estimating the driving force based on a detected value selected from the group consisting of: an accelerator position detected by an accelerator sensor; an engine revolution detected by an engine revolution sensor; and motor currents detected by a motor current sensor. The step of calculating a plurality of additive/subtractive slip points can include calculating each additive/subtractive slip point on the basis of a driving force correlation value that correlates to a driving force of a driving wheel for which the excess slipping has occurred.

The step of applying torque to a second driving wheel based on the cumulative slipping point can include determining whether the cumulative slipping point is greater than a first threshold and greater than a second threshold, wherein when the cumulative slipping point is greater than the first threshold, an all-wheel-drive mode is capable of being activated and when the cumulative slipping point is greater than the second threshold, a front-wheel-drive mode is capable of being activated. The step of calculating a plurality of additive/subtractive slips points comprises time-discretely calculating an additive/subtractive slip point on the basis of detection or non-detection of the occurrence of the excess slipping, the additive/subtractive slip point being an additive slip point or a subtractive slip point. The step of calculating a cumulative slipping point that is a sum of the plurality of additive/subtractive slip points comprises sequentially calculating a cumulative slip point that is a cumulative sum of values of the additive/subtractive slip points.

In another aspect, a method of controlling a driving mode of a vehicle can include the steps of driving a first driving wheel that is one of a front wheel and a rear wheel of a vehicle with a first driving device; driving a second driving wheel that is the other of the front wheel and the rear wheel of the vehicle with a second driving device; and selectively activating the first and second driving devices to control a driving mode of the first driving wheel and the second driving wheel.

The step of selectively activating the first and second driving devices to control a driving mode of the first driving wheel and the second driving wheel can include detecting the occurrence of excess slipping of the first driving wheel or the second driving wheel, the excess slipping being slipping of more than a predetermined amount; time-discretely calculating an additive/subtractive slip point on the basis of detection or non-detection of the occurrence of the excess slipping, the additive/subtractive slip point being an additive slip point or a subtractive slip point; sequentially calculating a cumulative slip point that is a cumulative sum of values of the additive/subtractive slip point; and switching between a two-wheel driving mode and an all-wheel driving mode on the basis of the cumulative slip point. The two-wheel driving mode can be a driving mode in which only one of the first driving wheel and the second driving wheel is used to drive the vehicle. The all-wheel driving mode can be a driving mode in which both the first driving wheel and the second driving wheel are used to drive the vehicle. When excess slipping is detected, the additive slip point can be calculated on the basis of a driving force correlation value that correlates to a driving force of a driving wheel for which the excess slipping has occurred.

DETAILED DESCRIPTION

Hereinafter, embodiments of the present disclosure will be described with reference to the drawings. In the description of the various embodiments, structures and steps will be denoted by the same numerals.

Figure 1:
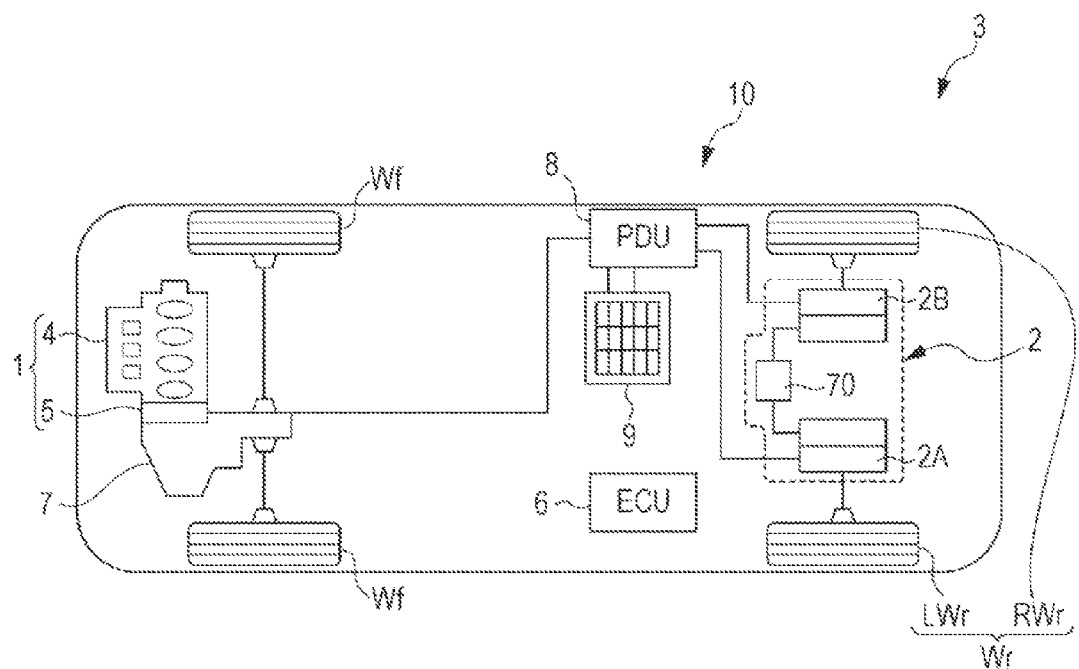
FIG. 1 illustrates a vehicle including a vehicle driving system according to a first embodiment of the present disclosure.

FIG. 1 illustrates a vehicle 3 including a vehicle driving system 10 according to the first embodiment of the present disclosure. The vehicle 3 can be a hybrid vehicle. As illustrated in FIG. 1, the vehicle driving system 10 of the vehicle 3 can include a first driving device 1, which can include any suitable components for driving a vehicle wheel, such as an internal combustion engine and/or an electric motor, plus a transmission. First driving device 1 can be mechanically connected to at least one drive wheel Wf, which can be one or more wheels at one end of a car. As shown in FIG. 1, first driving device 1 can be mechanically connected to both front wheels Wf to allow first driving device Wf to drive one or both of front wheels Wf.

Vehicle driving system 10 can include a second driving device 2 including, for example, at least one electric motor, and optionally two electric motors, first electric motor 2A and second electric motor 2B. Second driving device 2 can be mechanically connected to at least one drive wheel Wr, which can be one or more wheels at one end of a car. As shown in FIG. 1, first electric motor 2A can be mechanically connected to left rear wheel LWr and second electric motor 2B can be mechanically connected to right rear wheel RWr. To allow first and second electric motors 2A and 2B to drive rear wheels LWr and RWr, respectively.

Vehicle driving system 10 can further include an electronic control unit (hereinafter, referred to as "ECU") 6, capable of controlling first driving device 1 and second driving device 2. Vehicle driving system 10 can additionally include a power drive unit (PDU) 8; and a battery 9.

The first driving device 1 can be disposed in a front portion of the vehicle 3 and drives a first driving wheel Wf, which can include the left front wheel (LWf), right front wheel (RWf), or both. The first driving device 1 can include an internal combustion engine (ENG) 4, an electric motor 5, and a transmission 7. The internal combustion engine 4 and the electric motor 5 can be connected in series. Torque generated by the internal combustion engine 4 and the electric motor 5 are transmitted to one or both of the front wheels LWf and RWf through the transmission 7.

The internal combustion engine 4 is, for example, an in-line four-cylinder engine. The internal combustion engine 4 generates torque for driving the vehicle 3 by burning fuel such as gasoline. A crankshaft of the internal combustion engine 4 is connected to an output shaft of the electric motor 5.

The electric motor 5 is, for example, a three-phase current motor. The electric motor 5 generates torque for driving the vehicle 3 from electric power stored in the battery 9. The electric motor 5 is connected to the battery 9 through the PDU 8, which includes an inverter. The electric motor 5 assists a driving force of the internal combustion engine 4, for example, by supplementing the torque generated by internal combustion engine 4 with additional torque generated by electric motor 5.

The transmission 7 converts a torque generated by the internal combustion engine 4 and/or electric motor 5 into a torque corresponding to the number of revolutions reduced at a selected gear ratio, and transmits the torque to the front wheels Wf (LWf and RWf).

As shown in FIG. 1, second driving device 2 can be disposed in a rear portion of the vehicle 3 and drives a second driving wheel which can include one or both of rear wheels Wr (RWr and LWr). Torque generated by the electric motors 2A and 2B in second driving device 2 is transmitted to the rear wheels Wr (RWr and LWr).

Each of the electric motors 2A and 2B can be, for example, a three-phase current motor as with the electric motor 5. The electric motors 2A and 2B each can generate torque for driving the vehicle 3 from electric power stored in the battery 9. The electric motors 2A and 2B are connected to the battery 9 through the PDU 8, which can include an inverter. The ECU 6 sends control signals to the PDU 8 to control supply of electric power from the battery 9 to electric motors 2A and 2B and supply of regenerated energy from electric motors 2A and 2B to the battery 9.

Each of the front wheels Wf (LWf and RWf) and the rear wheels Wr (RWr and LWr) includes a friction brake (not shown). The friction brake is, for example, a hydraulic disk brake. When a driver depresses a brake pedal, a treading force is amplified and transmitted to a brake pad through a hydraulic cylinder and the like. Then, friction is generated between a brake disk attached to each of the driving wheels and the brake pad, and therefore brake is applied to each of the driving wheels.

Figure 2:
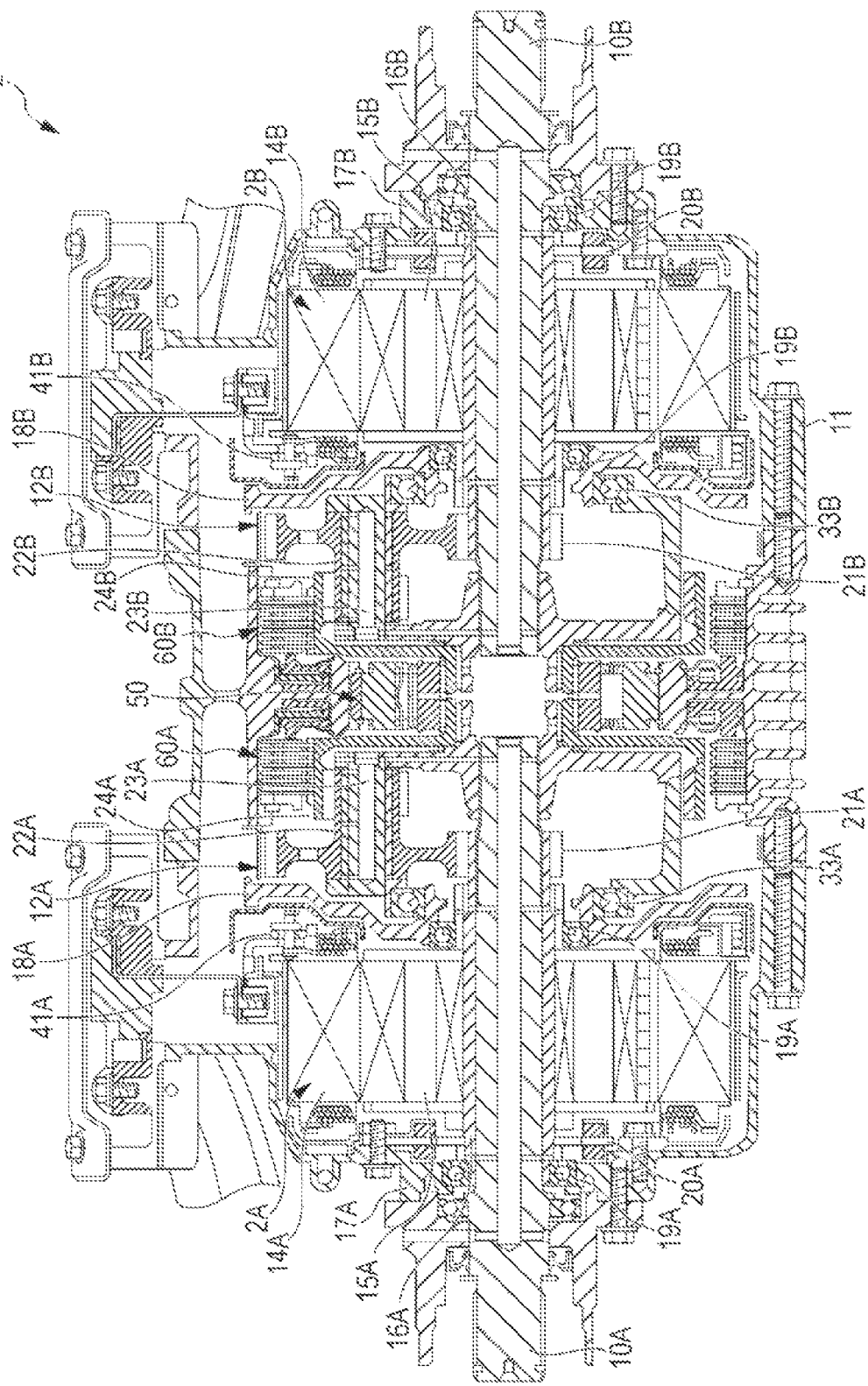
FIG. 2 is a longitudinal sectional view of a second driving device according to the embodiment.
Figure 3:
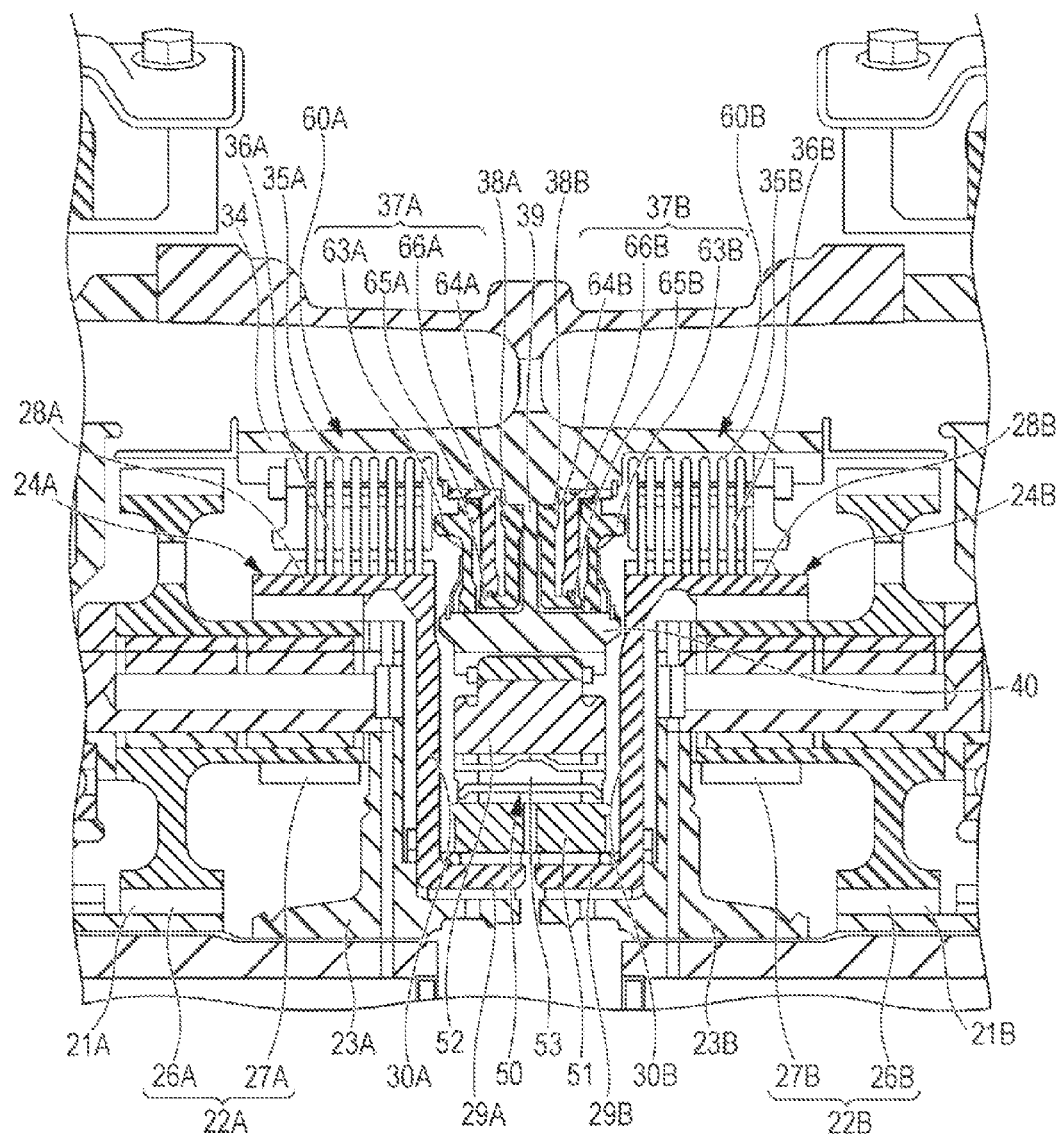
FIG. 3 is a partial enlarged longitudinal sectional view of the second driving device illustrated in FIG. 2.

One embodiment of the second driving device 2 will be described further in detail with reference to FIG. 2 and FIG. 3. It should be appreciated that driving device 2 can include any suitable driving device and the embodiment shown in FIG. 2 and FIG. 3 is provided by way of example only. The second driving device 2 shown in FIG. 2 and FIG. 3 is described in detail in Japanese Unexamined Patent Application Publication No. 2010-235051, the entire contents of which are incorporated herein by reference. FIG. 2 is a longitudinal sectional view of the second driving device 2 according to the present embodiment. FIG. 3 is a partial enlarged longitudinal sectional view of the second driving device 2 illustrated in FIG. 2. As illustrated in FIGS. 2 and 3, the second driving device 2 includes output shafts 10A and 10B through which driving forces are transmitted to the rear wheels RWr and LWr of the vehicle 3. The output shafts 10A and 10B are coaxially disposed so as to extend in the vehicle width direction. The output shafts 10A and 10B are respectively connected to axles of the rear wheels LWr and RWr. Electric motors 2A and 2B, which are mechanically connected to output shafts 10A and 10B in order to drive the output shafts 10A and 10B, and planetary-gear transmissions 12A and 12B, which reduce rotation velocities of the electric motors 2A and 2B, are disposed in a transmission case 11 so as to be coaxial with the output shafts 10A and 10B.

Stators 14A and 14B of the electric motors 2A and 2B are fixed to left and right inner end portions of the transmission case 11. Annular rotors 15A and 15B are rotatably disposed on inner peripherals sides of the stators 14A and 14B. Hollow cylindrical shafts 16A and 16B, which surround the output shafts 10A and 10B, are connected to the inner peripheral portions of the rotors 15A and 15B. The cylindrical shafts 16A and 16B are supported so as to be coaxial with the output shafts 10A and 10B and rotatable relative to the output shafts 10A and 10B. Resolvers 20A and 20B are disposed on end walls 17A and 17B of the transmission case 11. The resolvers 20A and 20B detect the rotational positions of the rotors 15A and 15B.

The planetary-gear transmissions 12A and 12B include sun gears 21A and 21B, a plurality of planetary gears 22A and 22B that mesh with the sun gears 21A and 21B, planetary carriers 23A and 23B that support the planetary gears 22A and 22B, and ring gears 24A and 24B the mesh with the outer peripheral sides of the planetary gears 22A and 22B. Driving forces of the electric motors 2A and 2B are input to the sun gears 21A and 21B, and driving forces having reduced rotational velocities are output through the planetary carriers 23A and 23B. For the details of the planetary-gear transmissions 12A and 12B, refer to Japanese Unexamined Patent Application Publication No. 2010-235051, the entire contents of which are incorporated herein by reference.

A cylindrical space is provided between the transmission case 11 and the ring gear 24A. In this space, a hydraulic brake 60 (including hydraulic brake portions 60A and 60B) for braking the ring gears 24A and 24B is disposed so as to overlap a second pinion 26A in the radial direction and so as to overlap a first pinion 27A in the axial direction, as shown in FIG. 3. The hydraulic brake 60 includes a plurality of fixed plates 35A and 35B and a plurality of rotary plates 36A and 36B, which are alternately arranged in the axial direction. The fixed plates 35A and 35B are spline-fitted to an inner peripheral surface of the transmission case 11. The rotary plates 36A and 36B are spline-fitted to an outer peripheral surface of the ring gear 24A. An annular piston 37 (including annular piston portions 37A and 37B) moves the plates 35A, 35B and 36A, 36B so that the plates 35A, 35B and 36A, 36B become engaged and disengaged. An annular cylinder chamber 38 (including annular cylinder chamber portions 38A and 38B) is formed among the transmission case 11, a support wall 39, and a cylindrical support portion 40. The piston 37 is retractably disposed in the cylinder chamber 38. The piston 37 advances when high-pressure oil is injected into the cylinder chamber 38 and retracts when the oil is discharged from the cylinder chamber 38. The hydraulic brake 60 is connected to an oil pump. For the details of the hydraulic brake 60 and the piston 37, refer to Japanese Unexamined Patent Application Publication No. 2010-235051, the entire contents of which are incorporated herein by reference.

A cylindrical space can be provided also between the transmission case 11 and the ring gear 24B. A one-way clutch 50 is disposed in the space. The one-way clutch 50 transmits power in one direction to the ring gears 24A and 24B but does not transmit power in the other direction to the ring gears 24A and 24B. The one-way clutch 50 includes an inner race 51, an outer race 52, and a large number of sprags 53 disposed between the inner and outer races 51 and 52. The inner race 51 is integrally formed with a gear portion 28B of the ring gear 24B. The outer race 52 is positioned by the inner peripheral surface of the transmission case 11 and is locked by the inner peripheral surface so as not to rotate. The one-way clutch 50 becomes engaged and locks rotation of the ring gears 24A and 24B when the vehicle 3 moves forward by using driving forces generated by the electric motors 2A and 2B. The one-way clutch 50 locks or unlocks the ring gears 24A and 24B in accordance with the direction of a torque applied to the ring gears 24A and 24B. When a direction in which the sun gears 21A and 21B rotate when the vehicle 3 moves forward is defined as a forward direction, the one-way clutch 50 locks rotation of the ring gears 24A and 24B when a torque is applied to the ring gears 24A and 24B in a reverse direction.

The planetary-gear transmissions 12A and 12B face each other in the axial direction in a middle portion of the second driving device 2, which has the structure described above. The ring gear 24A of the planetary-gear transmission 12A is connected to the ring gear 24B of the planetary-gear transmission 12B. The ring gears 24A and 24B, which are connected to each other, are rotatably supported by the cylindrical support portion 40 of the transmission case 11 through a bearing. The hydraulic brake 60 is disposed in a space between a radially peripheral portion of the planetary-gear transmission 12A and the transmission case 11. The one-way clutch 50 is disposed in a space between a radially peripheral portion of the planetary-gear transmission 12B and the transmission case 11. The piston 37, which activates the hydraulic brake 60, is disposed at a position between the hydraulic brake 60 and the one-way clutch 50 on a radially peripheral side of a bearing.

Figure 4:
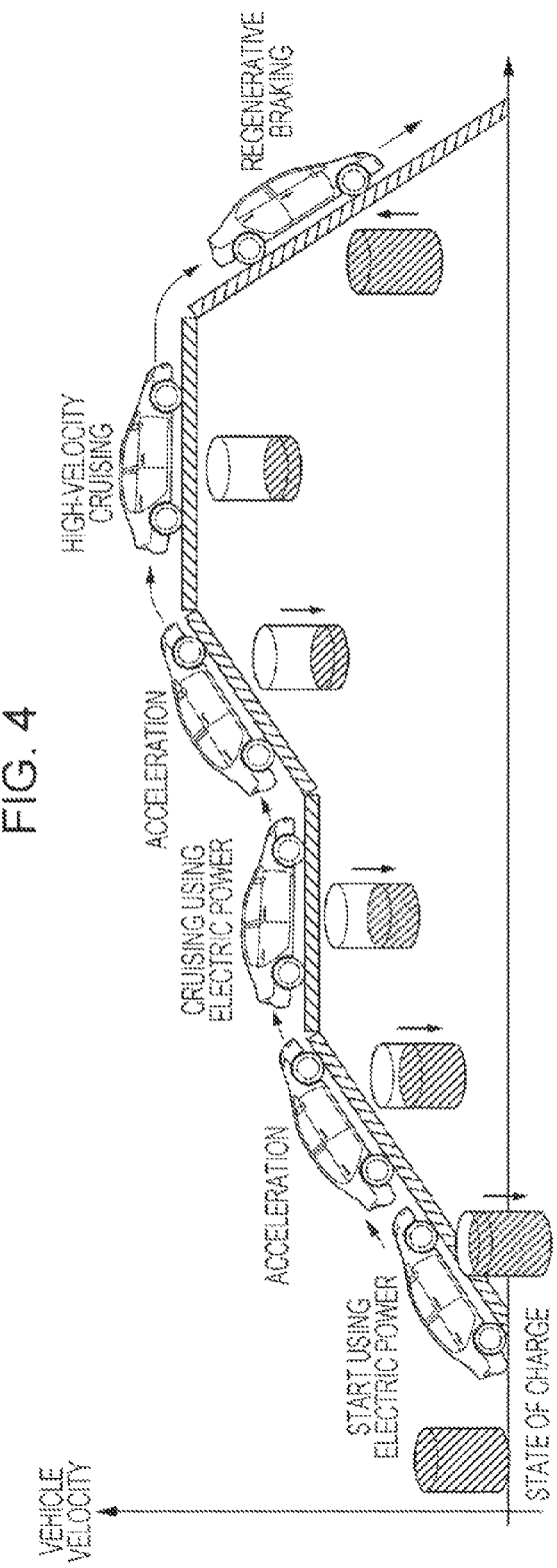
FIG. 4 illustrates states of an electric motor and an engagement mechanism when the vehicle according to the embodiment is moving.

The operation of the second driving device 2 during a period in which the vehicle is moving normally will be described. FIG. 4 illustrates states of the electric motors 2A and 2B and an engagement mechanism (including the one-way clutch 50 and the hydraulic brake 60) during a period in which the vehicle is moving. In FIG. 4, the term "front" refers to the first driving device 1, which drives the front wheels Wf (LWf and RWf); the term "rear" refers to the second driving device 2, which drives the rear wheels Wr (RWr and LWr); the symbol "○" denotes an active state (including driving and regeneration); and the symbol "x" denotes a non-active state (stop). The term "MOT state" refers to states of the electric motors 2A and 2B of the second driving device 2. The term "ON" refers to a state of the engagement mechanism in which the ring gears 24A and 24B are locked. The term "OFF" refers to a state of the engagement mechanism in which the ring gears 24A and 24B are free. The term "OWC" refers to the one-way clutch 50, and the term "BRK" refers to the hydraulic brake 60.

First, when the vehicle is not moving, the first driving device 1 for driving the front wheels Wf (LWf and RWf) and the second driving device 2 for driving the rear wheels Wr (RWr and LWr) are both stopped. Therefore, the electric motors 2A and 2B are stopped, and the engagement mechanism is in a non-active state. Next, when the ignition switch is turned on and the vehicle is started using electric power, the electric motors 2A and 2B of the second driving device 2 are driven. At this time, the engagement mechanism is locked by the one-way clutch 50, and the powers of the electric motors 2A and 2B are transmitted to the rear wheels RWr and LWr. When the vehicle accelerates, the driving mode is switched to an all-wheel (four-wheel) driving mode (AWD), in which both the first driving device 1 and the second driving device 2 are driven. Also at this time, the engagement mechanism is locked by the one-way clutch 50, and the powers of the electric motors 2A and 2B are transmitted to the rear wheels RWr and LWr. When the vehicle 3 is cruising at a low or medium velocity by using electric power, because the motor is highly efficient, the driving mode is a rear-wheel driving mode (RWD), in which the first driving device 1 is inactive and only the second driving device 2 is active. Also at this time, the engagement mechanism is locked by the one-way clutch 50, and the powers of the electric motors 2A and 2B are transmitted to the rear wheels RWr and LWr.

When the vehicle is cruising at a high velocity, because the engine is highly efficient, the driving mode is a front-wheel driving mode (FWD), in which only the front wheels LWf and RWf are driven by the first driving device 1. At this time, the electric motors 2A and 2B are stopped, because the one-way clutch 50 of the engagement mechanism is disengaged (OWC free) and the hydraulic brake 60 is not activated. When the vehicle naturally decelerates, the electric motors 2A and 2B are stopped, because the one-way clutch 50 of the engagement mechanism is disengaged (OWC free) and the hydraulic brake 60 is not activated.

During regenerative braking, for example, in a case where the vehicle is driven by the first driving device 1, the hydraulic brake 60 is engaged while the one-way clutch 50 of the engagement mechanism is disengaged (OWC free), so that the electric motors 2A and 2B perform regenerative charging. During normal driving, the electric motors 2A and 2B recover kinetic energy by performing regenerative braking in cooperation with a friction brake. When sudden braking is required (for example, when ABS is activated), regenerative braking by the electric motors 2A and 2B is prohibited and braking control using the friction brake is given priority. In this case, the one-way clutch 50 (OWC free) is disengaged the hydraulic brake 60 is deactivated, so that the electric motors 2A and 2B are stopped.

During reverse driving, the driving mode is a rear-wheel driving mode (RWD), in which the first driving device 1 is stopped and the second driving device 2 drives the rear wheels, or an all-wheel driving mode (AWD), in which the first driving device 1 and the second driving device 2 drive front and rear wheels LWf and RWf. At this time, although the electric motors 2A and 2B rotate in the reverse direction and the one-way clutch 50 of the engagement mechanism is disengaged (OWC free), the hydraulic brake 60 is engaged so that the driving forces of the electric motors 2A and 2B are transmitted to the rear wheels RWr and LWr.

Figure 5:
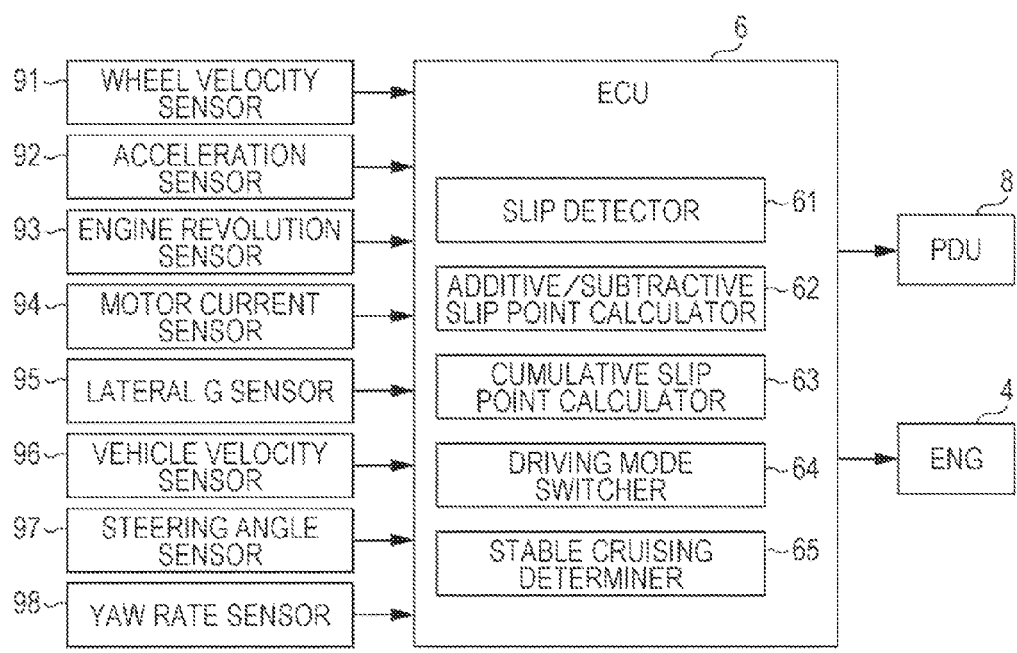
FIG. 5 is a functional block diagram of an ECU according to the embodiment.

Next, ECU 6 will be described with reference to FIG. 5. The ECU 6 can include any suitable controller, such as a microprocessor or combination of processors and/or associated circuitry, such as an input circuit, storage circuit, and/or output circuit (hereinafter, referred to as "CPU"). The controller of CPU can include any suitable controlling or processing device, including any suitable combination of hardware, which can be programmed with any suitable software for performing the desired functions of the controller. By way of example only, ECU 6 can include a microprocessor such as the SH7250 series of microprocessor sold by Renesas Electronics Corporation. It should be understood that any other suitable controller can be used.

The input circuit can have, for example, a function of regulating the waveforms of input signals from various sensors, a function of correcting voltages to predetermined levels, a function of converting an analog signal into a digital signal, and other known functions. The ECU 6 can further include a storage circuit and an output circuit. The storage circuit stores various calculation programs which are executed by the CPU and the results of calculations. The storage circuit can include any suitable storage apparatus or device, including the SH7250 series of microprocessor sold by Renesas Electronics Corporation, which includes suitable memory for storing the calculation programs. It should be understood that any other suitable storage device can be used and that the storage device can be provided in the same integrated circuit as the controller. The output circuit can output control signals, for example, to the PDU 8 and the internal combustion engine 4, and any other component or device that is controlled by ECU 6. Examples of output circuitry devices include the output circuitry included in and/or associated with the SH7250 series of microprocessor sold by Renesas Electronics Corporation, and similar microprocessor chips.

The ECU 6, which has the hardware configuration described above, can be programmed with software to perform driving mode switching control for switching the driving mode of the vehicle 3. FIG. 5 is a functional block diagram of the ECU 6 according to the present embodiment. As illustrated in FIG. 5, detection signals are input to the ECU 6 from, for example, the following sensors: a wheel velocity sensor 91, an acceleration sensor 92, an engine revolution sensor 93, a motor current sensor 94, a lateral G sensor 95, a vehicle velocity sensor 96, a steering angle sensor 97, and a yaw rate sensor 98. It should be understood that information from additional sensors can be input to ECU 6, in addition to the sensors described above.

The ECU 6 outputs control signals to the PDU 8 and the internal combustion engine (ENG) 4. The ECU 6 includes the following modules for performing driving mode switching control: a slip detector 61, an additive/subtractive slip point calculator 62, a cumulative slip point calculator 63, a driving mode switcher 64, and a stable cruising determiner 65. Hereinafter, functions of these modules will be described. It should be understood that ECU 6 can include modules for performing any other function which is related to or improves driving mode switching control, in addition to the functions described below.

The slip detector 61 detects an occurrence of excess slipping of the front wheels Wf (LWf and RWf) LWf and RWf, which correspond to a first driving wheel, or the rear wheels Wr (RWr and LWr), which correspond to a second driving wheel. Here, the term "excess slip" refers to slipping of more than a predetermined amount. To be specific, the slip detector 61 detects an occurrence of excess slipping on the basis of the difference between the wheel velocities of the front wheels LWf and RWf and the rear wheels Wr (RWr and LWr), which is detected by the wheel velocity sensor 91. When the slip detector 61 detects an occurrence of excess slipping, a slip flag is set to "1". When the slip detector 61 does not detect an occurrence of excess slipping, the slip flag is set to "0". It should be appreciated that slight slipping of a driving wheel may constant occurs even when the vehicle 3 is moving along a dry road having a high coefficient of friction (M). Such slight slipping is excluded from "excess slip" in the present embodiment. Hereinafter, "occurrence of excess slipping" may be simply referred to as "occurrence of slipping".

Slip detector 61 can include any suitable hardware and/or software configured to perform the described driving mode switching function, including, for example, a suitable controller such as a microprocessor which can be programmed with suitable software. Slip detector 61 can include ECU 6 or a separate controller.

The additive/subtractive slip point calculator 62 repeatedly calculates an additive/subtractive slip point on the basis of detection or non-detection of an occurrence of excess slipping by the slip detector 61. For example, the additive/subtractive slip point calculator 62 can calculate an additive/subtractive slip point in time-discretely at predetermined intervals. The additive/subtractive slip point is an additive slip point or a subtractive slip point. That is, the additive/subtractive slip point calculator 62 calculates the additive slip point on the basis of detection of an occurrence of excess slipping by the slip detector 61. The additive/subtractive slip point calculator 62 calculates the subtractive slip point on the basis of non-detection of an occurrence of excess slipping by the slip detector 61.

Additive/subtractive slip point calculator 62 can include any suitable hardware and/or software configured to perform the described driving mode switching function, including, for example, a suitable controller such as a microprocessor which can be programmed with suitable software. Additive/subtractive slip point calculator 62 can include ECU 6 or a separate controller.

Figure 6:
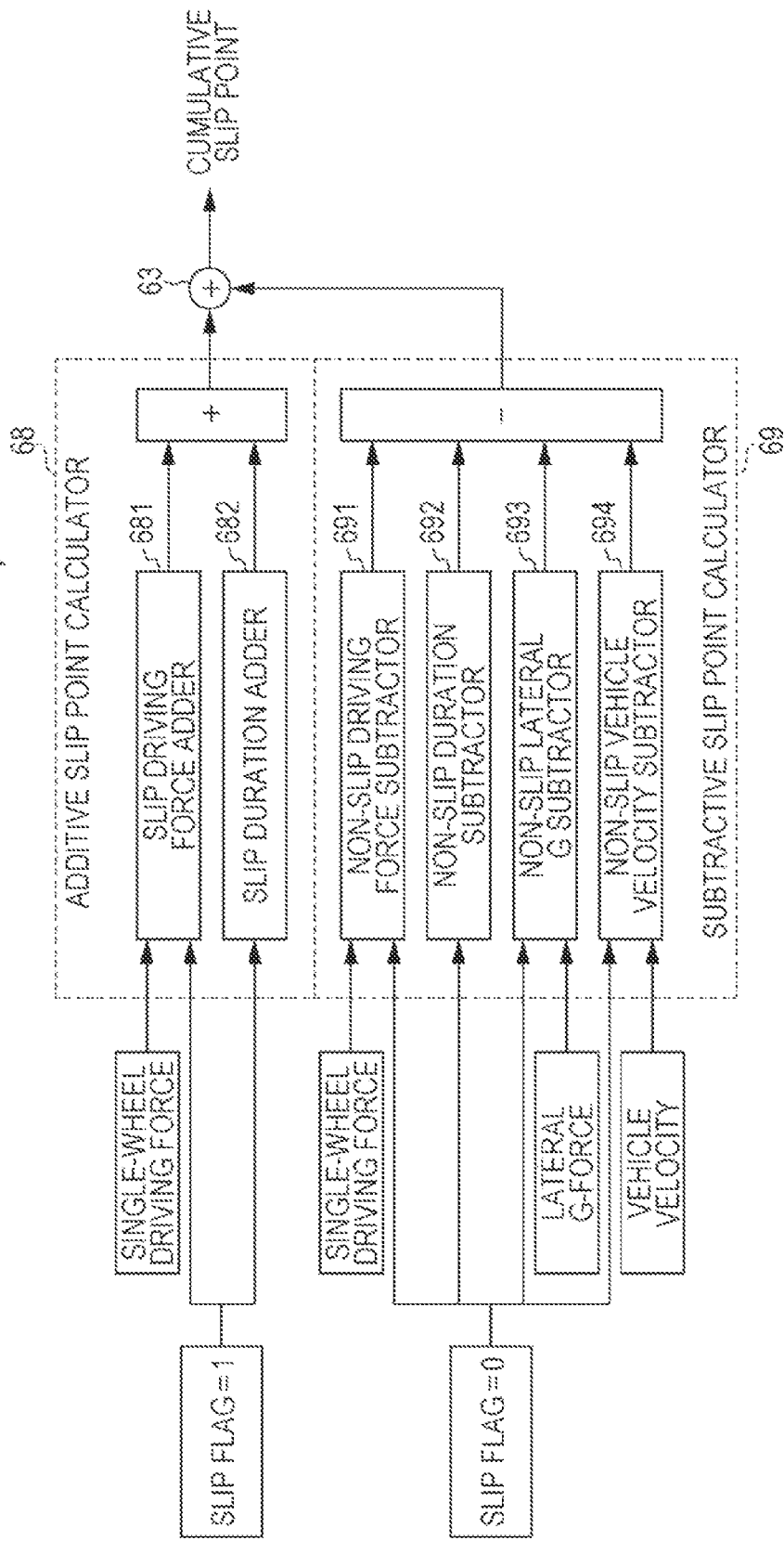
FIG. 6 is a functional block diagram of an additive/subtractive slip point calculator according to the embodiment.

FIG. 6 is a functional block diagram of the additive/subtractive slip point calculator 62 according to the present embodiment. As illustrated in FIG. 6, if the slip detector 61 detects an occurrence of excess slipping, that is, when the slip flag is "1", additive/subtractive slip point calculator 62 calculates the additive slip point on the basis of a driving force correlation value that correlates to a driving force of a driving wheel for which the excess slipping has occurred. Examples of the driving force correlation value include a wheel (single-wheel) driving force, a wheel (single-wheel) torque, driving forces of the first driving device 1 and the second driving device 2 for driving wheels, and torques of the first driving device 1 and the second driving device 2 for driving wheels. In the following description, the wheel (single-wheel) driving force is used as an example.

As illustrated in FIG. 6, the additive/subtractive slip point calculator 62 includes an additive slip point calculator 68 and a subtractive slip point calculator 69. When the slip flag is "1", the additive slip point calculator 68 of the additive/subtractive slip point calculator 62 calculates the additive slip point, which has a positive value, and sends the calculated additive slip point to the cumulative slip point calculator 63. When the slip flag is "0", the subtractive slip point calculator 69 of the additive/subtractive slip point calculator 62 calculates the subtractive slip point, which has a negative value, and sends the calculated subtractive slip point to the cumulative slip point calculator 63.

The additive slip point calculator 68 includes a slip driving force adder 681 and a slip duration adder 682. The additive slip point calculator 68 calculates the additive slip point by adding additive slip points, which have been calculated by these adders and have positive values.

The slip driving force adder 681 calculates a driving force additive slip point, which corresponds to an additive slip point, by searching a driving force additive slip point table described below (see FIG. 9), which has been made and stored in advance, in accordance with a single-wheel driving force (N=Newtons) when slipping occurs. The slip driving force adder 681 calculates a larger driving force additive slip point for a smaller single-wheel driving force when slipping occurs, as long as the calculated additive slip point does not exceed the first threshold. In the present specification, the term "single-wheel driving force" refers to the largest one of the driving forces of the four wheels of the vehicle 3. The single-wheel driving force can be detected by a sensor. Alternatively, the single-wheel driving force may be estimated from, for example, an accelerator position detected by the accelerator sensor 92; an engine revolution detected by the engine revolution sensor 93; motor currents detected by the motor current sensor 94, which is provided in each of electric motors 5, 2A, and 2B; or other sensors capable of detecting behavior related to single-wheel driving force. The value of the first threshold is set in advance at a level that is appropriate as an indicator for switching between the all-wheel driving mode (AWD) and the two-wheel driving mode (2WD). The first threshold is greater than a second threshold described below.

The slip duration adder 682 calculates a time additive slip point, which corresponds to an additive slip point, by searching a time additive slip point table described below (see FIG. 10), which has been made and stored in advance, in accordance with a slip duration (sec), that is, a time period during which the slip flag is "1". The slip duration adder 682 calculates a larger time additive slip point for a longer slip duration until the cumulative sum of the time additive slip points exceeds a first threshold described below. After the cumulative sum has exceeded the first threshold, the slip duration adder 682 calculates a time additive slip point that is substantially equal to 0.

As illustrated in FIG. 6, the subtractive slip point calculator 69 includes a non-slip driving force subtractor 691, a non-slip duration subtractor 692, a non-slip lateral G subtractor 693, and a non-slip vehicle velocity subtractor 694. The subtractive slip point calculator 69 calculates the subtractive slip point by adding subtractive slip points, which have been calculated by these subtractors and have negative values.

The non-slip driving force subtractor 691 calculates a driving force subtractive slip point, which corresponds to a subtractive slip point, by searching a driving force subtractive slip point table described below (see FIG. 12), which has been made and stored in advance, in accordance with a single-wheel driving force (N) when slipping does not occur. If the single-wheel driving force when slipping does not occur is less than a predetermined value, the non-slip driving force subtractor 691 calculates the driving force subtractive slip point as 0. If the single-wheel driving force when slipping does not occur is greater than or equal to the predetermined value, the non-slip driving force subtractor 691 calculates a subtractive slip point having a comparatively large constant absolute value.

The non-slip duration subtractor 692 calculates a time subtractive slip point, which corresponds to a subtractive slip point, by searching a time subtractive slip point table described below (see FIG. 14), which has been made and stored in advance, in accordance with a non-slip duration (sec), that is, a time period during which the slip flag is "0". Irrespective of the length of the non-slip duration, the non-slip duration subtractor 692 calculates a time subtractive slip point having a comparatively large constant absolute value.

The non-slip lateral G subtractor 693 calculates a lateral G subtractive slip point, which corresponds to a subtractive slip point, by searching a lateral G subtractive slip point table (see FIG. 16), which has been made and stored in advance, in accordance with a lateral G-force detected by the lateral G sensor 95 when slipping does not occur. If the lateral G-force when slipping does not occur is less than a predetermined value, the non-slip lateral G subtractor 693 calculates the lateral G subtractive slip point as 0. If the lateral G subtractive slip point is greater than or equal to the predetermined value, the non-slip lateral G subtractor 693 calculates a lateral G subtractive slip point having a comparatively large constant absolute value.

The non-slip vehicle velocity subtractor 694 calculates a vehicle velocity subtractive slip point, which corresponds to a subtractive slip point, by using a vehicle velocity subtractive slip point table described below (see FIG. 18), which has been made and stored in advance, in accordance with a vehicle velocity detected by the vehicle velocity sensor 96 when slipping does not occur. If the vehicle velocity when slipping does not occur is less than a predetermined value, the non-slip vehicle velocity subtractor 694 calculates a vehicle velocity subtractive slip point having a comparatively large constant absolute value. If the vehicle velocity when slipping does not occur is greater than or equal to the predetermined value, the non-slip vehicle velocity subtractor 694 calculates the vehicle velocity subtractive slip point as 0.

The cumulative slip point calculator 63 sequentially calculates a cumulative slip point by adding the additive slip point calculated by the additive slip point calculator 68 and the subtractive slip point calculated by the subtractive slip point calculator 69.

Cumulative slip point calculator 63 can include any suitable hardware and/or software configured to perform the described driving mode switching function, including, for example, a suitable controller such as a microprocessor which can be programmed with suitable software. Cumulative slip point calculator 63 can include ECU 6 or a separate controller.

Referring back to FIG. 5, the driving mode switcher 64 switches between the two-wheel driving mode (2WD) and the all-wheel driving mode (AWD) on the basis of the cumulative slip point calculated by the cumulative slip point calculator 63. Driving mode switcher 64 can include any suitable hardware and/or software configured to perform the described driving mode switching function, including, for example, a suitable controller such as a microprocessor which can be programmed with suitable software. Driving mode switcher 64 can include ECU 6 or a separate controller.

In the two-wheel driving mode (2WD), one of the front wheels Wf (LWf and RWf), which correspond to a first driving wheel, and the rear wheels Wr (RWr and LWr), which correspond to a second driving wheel, is used to drive the vehicle 3. In the all-wheel driving mode (AWD), both the front wheels LWf and RWf, which correspond to a first driving wheel, and the rear wheels Wr (RWr and LWr), which correspond to a second driving wheel, are used to drive the vehicle 3. The two-wheel driving mode includes the front-wheel driving mode (FWD), in which only the front wheels LWf and RWf drive the vehicle 3, and the rear-wheel driving mode (RWD), in which only the rear wheels Wr (RWr and LWr) drive the vehicle 3. Driving mode switcher 64 switches among the front-wheel driving mode (FWD), the rear-wheel driving mode (RWD), and the all-wheel driving mode (AWD).

When the cumulative slip point is at or above the first threshold, the driving mode switcher 64 sets a slip AWD request flag to "1", and switches the driving mode of the vehicle 3 to the all-wheel driving mode (AWD). When the cumulative slip point is below the first threshold and a stable cruising flag described below is "1", the driving mode switcher 64 sets the slip AWD request flag to "0" and switches the driving mode of the vehicle 3 to the two-wheel driving mode (2WD). The slip AWD request flag when set to 1 allows only the AWD state.

When the cumulative slip point is at or above the second threshold, the driving mode switcher 64 sets an RWD prohibition request flag to "1", and switches the driving mode of the vehicle 3 to the front-wheel driving mode (FWD). The RWD prohibition request flag when set to 1 prohibits the RWD state and therefore to allow only the FWD state and the AWD state.

When the cumulative slip point is below the second threshold, the driving mode switcher 64 sets the RWD prohibition request flag to "0", and switches the driving mode of the vehicle 3 to the rear-wheel driving mode (RWD). The value of the second threshold is set in advance at a level that is appropriate as an indicator for switching between the front-wheel driving mode (FWD) and the rear-wheel driving mode (RWD). The second threshold is less than the first threshold described above.

The stable cruising determiner 65 determines whether or not the vehicle 3 is stably cruising. To be specific, in a case where the slip AWD request flag is "1", the stable cruising determiner 65 determines whether or not the vehicle 3 is stably cruising on the basis of detection values of the steering angle sensor 97, the yaw rate sensor 98, the vehicle velocity sensor 96, the wheel velocity sensor 91, and the like or on the basis of an estimated value estimated from the detection values. If the stable cruising determiner 65 determines that the vehicle 3 is stably cruising, the stable cruising determiner 65 sets a stable cruising flag to "1". If not, the stable cruising determiner 65 sets the stable cruising flag to "0".

Figure 7:
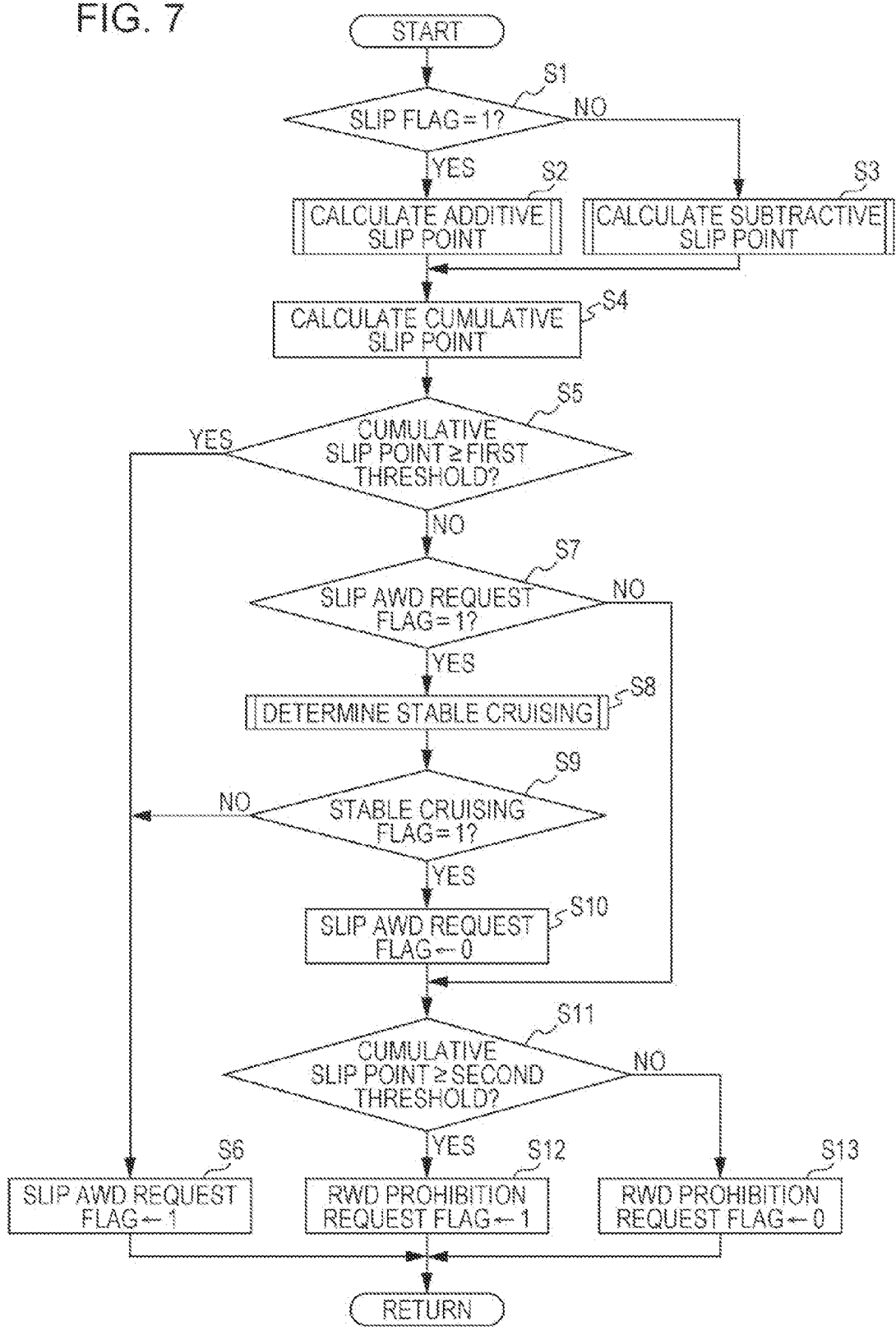
FIG. 7 is a flowchart representing a process for controlling switching of a driving mode according to the embodiment.

Next, a control process that is performed by the ECU 6 to switch the driving mode according to the present embodiment will be described. FIG. 7 is a flowchart representing the process for controlling switching of the driving mode according to the present embodiment. This process is repeatedly performed by the ECU 6.

In step S1, whether or not the slip flag is "1" is determined. If the determination is "YES", which means that an occurrence of slipping is detected, the additive slip point is calculated in step S2, and the process proceeds to step S4. If the determination is "NO", which means that an occurrence of slipping is not detected, the subtractive slip point is calculated in step S3, and the process proceeds to step S4.

In step S4, the cumulative slip point is calculated by adding the additive slip point calculated in step S2 or the subtractive slip point calculated in step S3 to the previous value of the cumulative slip point. Subsequently, the process proceeds to step S5.

In step S5, whether or not the cumulative slip point calculated in step S4 is at or above the first threshold is determined.

If the determination is "YES", the process proceeds to step S6. If the determination is "NO", the process proceeds to step S7.

In step S6, the slip AWD request flag is set to "1", and the process is finished. Thus, switching to AWD is performed, or AWD is maintained.

In step S7, whether or not the slip AWD request flag is "1" is determined. If the determination is "YES", the process proceeds to step S8. If the determination is "NO", the process proceeds to step S11.

In step S8, whether or not the vehicle 3 is stably cruising is determined. If it is determined that the vehicle 3 is stably cruising, the stable cruising flag is set to "1". If it is determined that the vehicle 3 is not stably cruising, the stable cruising flag is set to "0".

In step S9, whether or not the stable cruising flag, which has been set in step S8, is "1" is determined. If the determination is "YES", which means that the vehicle 3 is stably cruising, the slip AWD request flag is set to "0" in step S10, and the process proceeds to step S11. Thus, switching to 2WD, that is, FWD or RWD, is performed.

If the determination in step S9 is "NO", which means that the vehicle 3 is not stably cruising, the slip AWD request flag is set to "1" in step S6, and the process is finished. Thus, AWD is maintained.

In step S11, whether or not the cumulative slip point, which has been calculated in step S4, is at or above the second threshold, which is less than the first threshold, is determined. If the determination is "YES", the process proceeds to step S12. If the determination is "NO", the process proceeds to step S13.

In step S12, the RWD prohibition request flag is set to "1", and the process is finished. Thus, switching to RWD is prohibited, and switching to FWD is performed or FWD is maintained.

In step S13, the RWD prohibition request flag is set to "0", and the process is finished. Thus, switching to FWD or RWD is performed, or FWD or RWD is maintained.

The steps S8 and S9, which are related to stable cruising of the vehicle 3, may be omitted.

Next, the process for calculating the additive slip point according to the present embodiment, which is performed in step S2 of FIG. 7, will be described. In the process for calculating the additive slip point according to the present embodiment, the driving force additive slip point is calculated through a process for calculating the driving force additive slip point, the time additive slip point is calculated through a process for calculating the time additive slip point, and subsequently the calculated additive slip points are added together.

Figure 8:
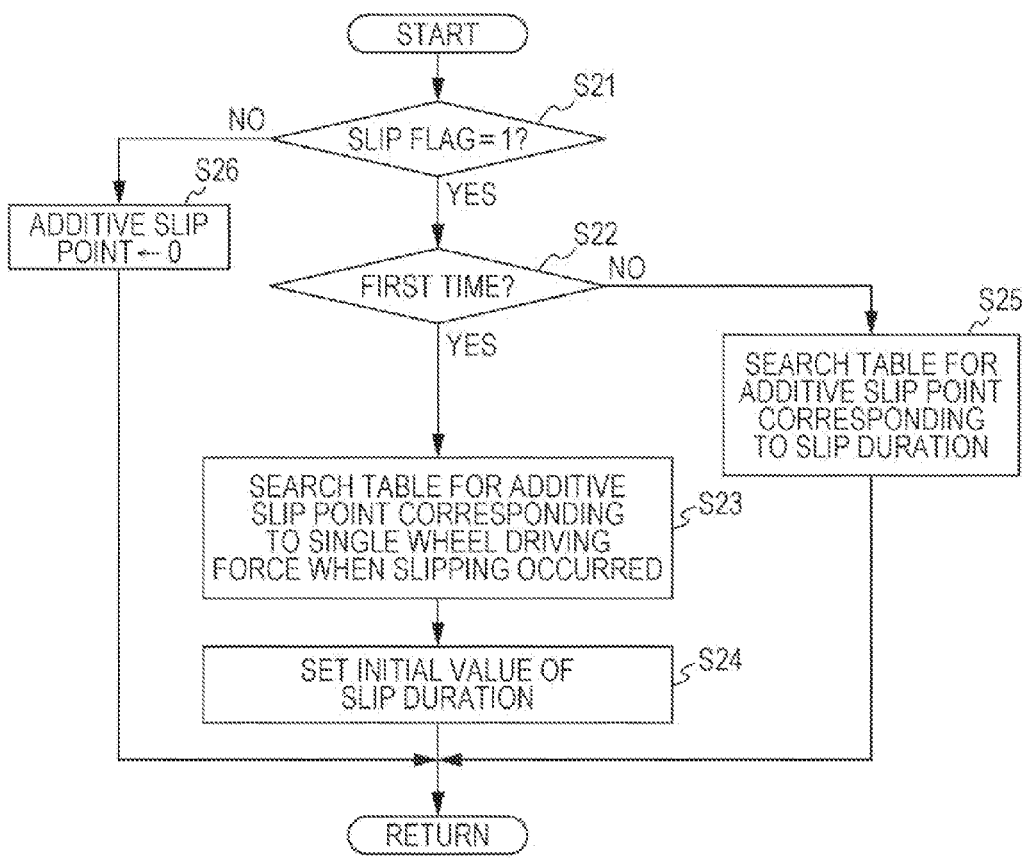
FIG. 8 is a flowchart representing a process for calculating an additive slip point according to the embodiment.

FIG. 8 is a flowchart representing the process for calculating the additive slip point according to the present embodiment. In step S21, whether or not the slip flag is "1" is determined. If the determination is "YES", the process proceeds to step S22. If the determination is "NO", the process proceeds to step S26, the additive slip point is reset to "0", and the process is finished.

In step S22, whether or not the process is performed for the first time is determined. If the determination is "YES", the process proceeds to step S23. If the determination is "NO", the process proceeds to step S25.

In step S23, a table is searched for an additive slip point corresponding to the single-wheel driving force when slipping occurred. To be specific, the driving force additive slip point is calculated by searching the driving force additive slip point table, which has been made and stored in advance in the slip driving force adder 681, in accordance with a single-wheel driving force when slipping occurred. Subsequently, the process proceeds to step S24.

Figure 9:
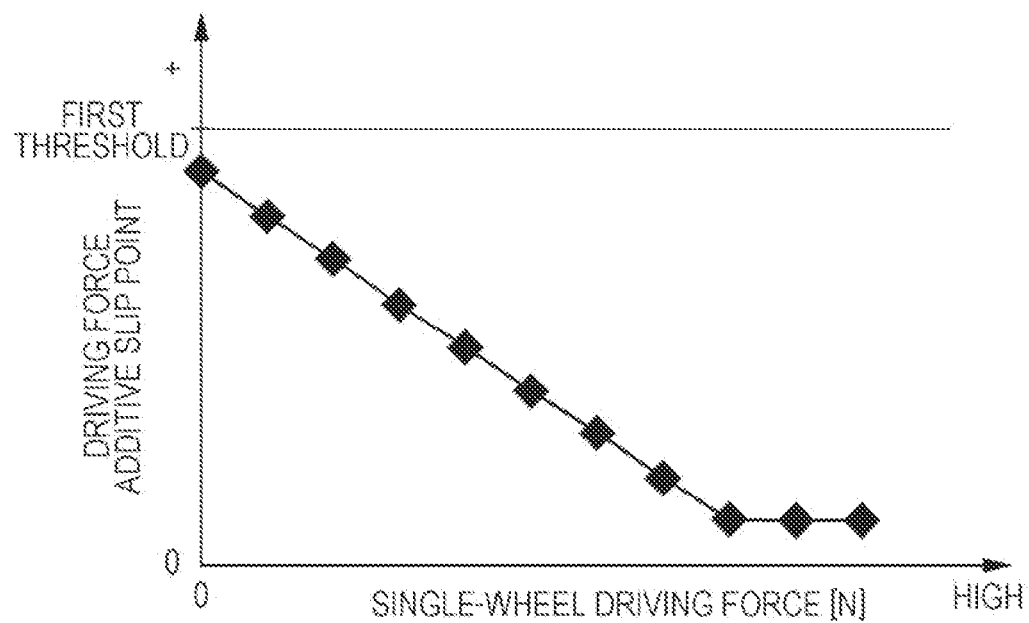
FIG. 9 is a diagram illustrating a driving force additive slip point table, which is stored in a slip driving force adder according to the embodiment.

FIG. 9 is a diagram illustrating the driving force additive slip point table, which is stored in the slip driving force adder 681. In FIG. 9, the horizontal axis represents the single-wheel driving force (N), and the vertical axis represents the driving force additive slip point, which has a positive value. As illustrated in FIG. 9, the driving force additive slip point table is configured in such a way that the driving force additive slip point increases, within a range not exceeding the first threshold, as the single-wheel driving force when slipping occurs decreases. This is because, in a case where slipping occurs, a smaller single-wheel driving force implies that the road surface has a lower coefficient of friction ($\mu$), and therefore it is necessary to perform switching to AWD earlier or to maintain AWD for a longer period by setting a larger driving force additive slip point for a smaller single-wheel driving force. However, the driving force additive slip point table is configured in such a way that the driving force additive slip point is constant when the single-wheel driving force is larger than a certain value.

Referring back to FIG. 8, in step S24, the initial value of slip duration is set, and the process is finished. To be specific, for example, as shown by the Y intercept in FIG. 10, the cumulative sum of the time additive slip points when the slip duration is 0 seconds, that is, the initial value of slip duration, may be set to 0.

In step S25, a table is searched for an additive slip point corresponding to the slip duration, and the process is finished. To be specific, the time additive slip point is calculated by searching the time additive slip point table, which has been made and stored in advance in the slip duration adder 682, in accordance with a slip duration.

Figure 10:
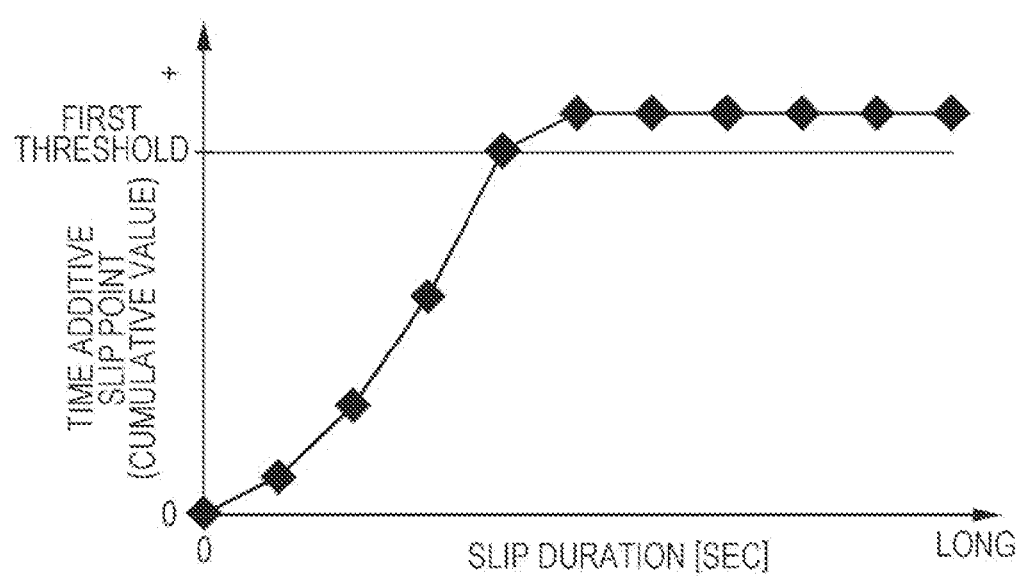
FIG. 10 is a diagram illustrating a time additive slip point table, which is stored in a slip duration adder according to the embodiment.

FIG. 10 is a diagram illustrating the time additive slip point table, which is stored in the slip duration adder 682. In FIG. 10, the horizontal axis represents the slip duration (sec), and the vertical axis represents the cumulative sum of time additive slip points, which have positive values. That is, the value of time additive slip point for a single occurrence of slipping is represented by the difference between two adjacent values of the cumulative sum of time additive slip points illustrated in FIG. 10. As illustrated in FIG. 10, the time additive slip point table is configured in such a way that the cumulative sum of time additive slip points increases as the slip duration increases until the cumulative sum of time additive slip points exceeds the first threshold. This is because, in a case where the slip duration too short, determination of slipping may be inaccurately performed, and therefore it is necessary to avoid unnecessary switching to AWD when the road surface has a high coefficient of friction ($\mu$) by setting a larger time additive slip point for a shorter slip duration. Note that a time additive slip point corresponding to a slip duration is set so as to be within an all-wheel driving mode (AWD) request response time. The time additive slip point table is configured in such a way that, after the cumulative sum of the time additive slip points has exceeded the first threshold, a time additive slip point that is substantially 0 is successively calculated and therefore the cumulative sum of the time additive slip points becomes substantially constant. This is because, if the cumulative sum of the time additive slip points exceeds the first threshold by a large amount, duration of the all-wheel driving mode (AWD) becomes too long and the driving efficiency (fuel economy and electricity-use economy) decreases.

Next, a process for calculating the subtractive slip point according to the present embodiment, which is performed in step S3 of FIG. 7, will be described. In the process for calculating the subtractive slip point according to the present embodiment, the driving force subtractive slip point is calculated through a process for calculating the driving force subtractive slip point, the time subtractive slip point is calculated through a process for calculating the time subtractive slip point, and subsequently the calculated subtractive slip points are added together.

Figure 11:
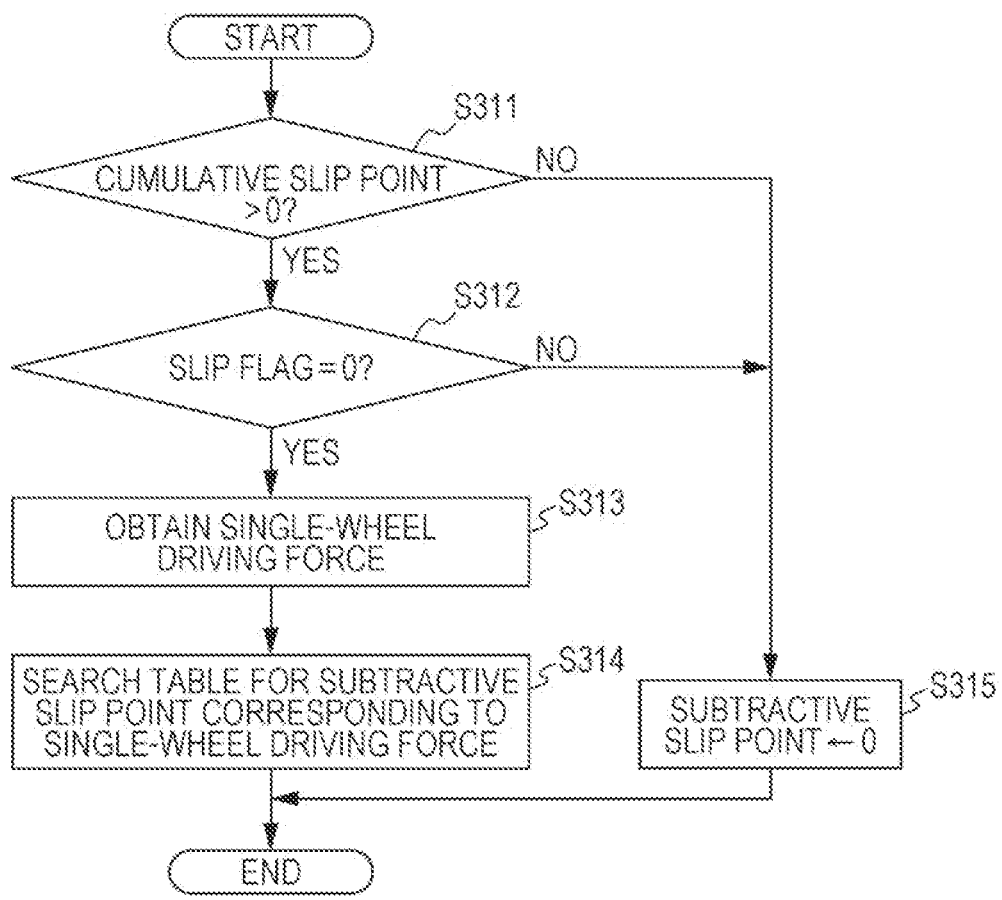
FIG. 11 is a flowchart representing a process for calculating a driving force subtractive slip point according to the embodiment.

FIG. 11 is a flowchart representing the process for calculating the driving force subtractive slip point according to the present embodiment. In step S311, whether or not the cumulative slip point is greater than 0 is determined. If the determination is "YES", which means that the cumulative slip point has accumulated, the process proceeds to step S312. If the determination is "NO", which means that the cumulative slip point has not accumulated, the subtractive slip point is set to 0 in step S315, and the process is finished. Thus, if the cumulative slip point is 0, the subtractive slip point is calculated only as 0. Therefore, the cumulative slip point does not become negative.

In step S312, whether or not the slip flag is "0" is determined. If the determination is "YES", the process proceeds to step S313, a single-wheel driving force when slipping does not occur is obtained, and the process proceeds to step S314. If the determination is "NO", the process proceeds to step S315, the subtractive slip point is set to 0, and the process is finished.

In step S314, a table is searched for a subtractive slip point corresponding to the single-wheel driving force, which has been obtained in step S313, and the process is finished. The driving force subtractive slip point can be calculated by searching the driving force subtractive slip point table, which has been made and stored in advance in the non-slip driving force subtractor 691, in accordance with a single-wheel driving force when slipping does not occur.

Figure 12:
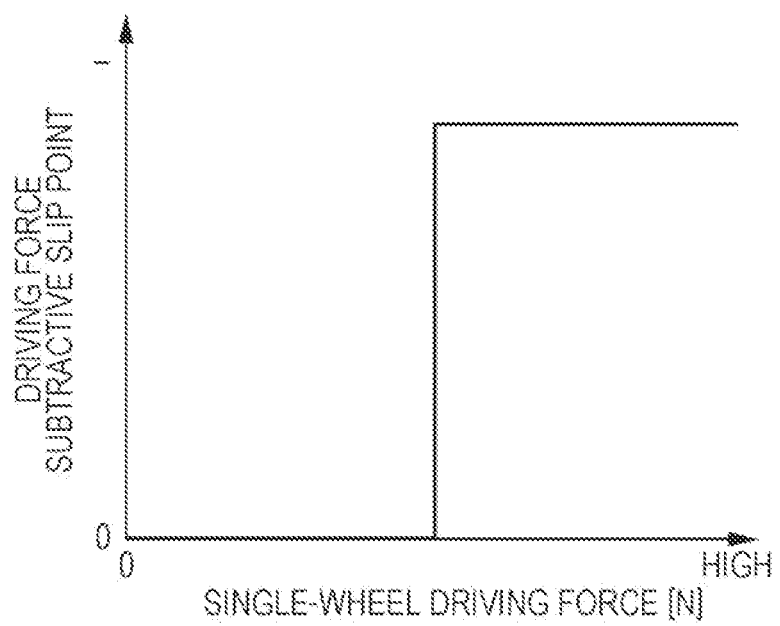
FIG. 12 is a diagram illustrating a driving force subtractive slip point table, which is stored in a non-slip driving force subtractor according to the embodiment.

FIG. 12 is a diagram illustrating the driving force subtractive slip point table, which is stored in the non-slip driving force subtractor 691. In FIG. 12, the horizontal axis represents the single-wheel driving force (N), and the vertical axis represents the driving force subtractive slip point, which has a negative value. As illustrated in FIG. 12, the driving force subtractive slip point table is configured in such a way that, if the single-wheel driving force when slipping does not occur is less than a predetermined value, the driving force subtractive slip point is 0; and if the single-wheel driving force when slipping does not occur is greater than or equal to the predetermined value, the driving force subtractive slip point has a comparatively large constant absolute value. This is because, in a case where slipping does not occur, a larger single-wheel driving force implies that the road surface surely has a high coefficient of friction, and therefore it is necessary to avoid switching to 2WD when the road surface has a low coefficient friction (μ) by setting a larger driving force subtractive slip point for a larger single-wheel driving force.

Figure 13:
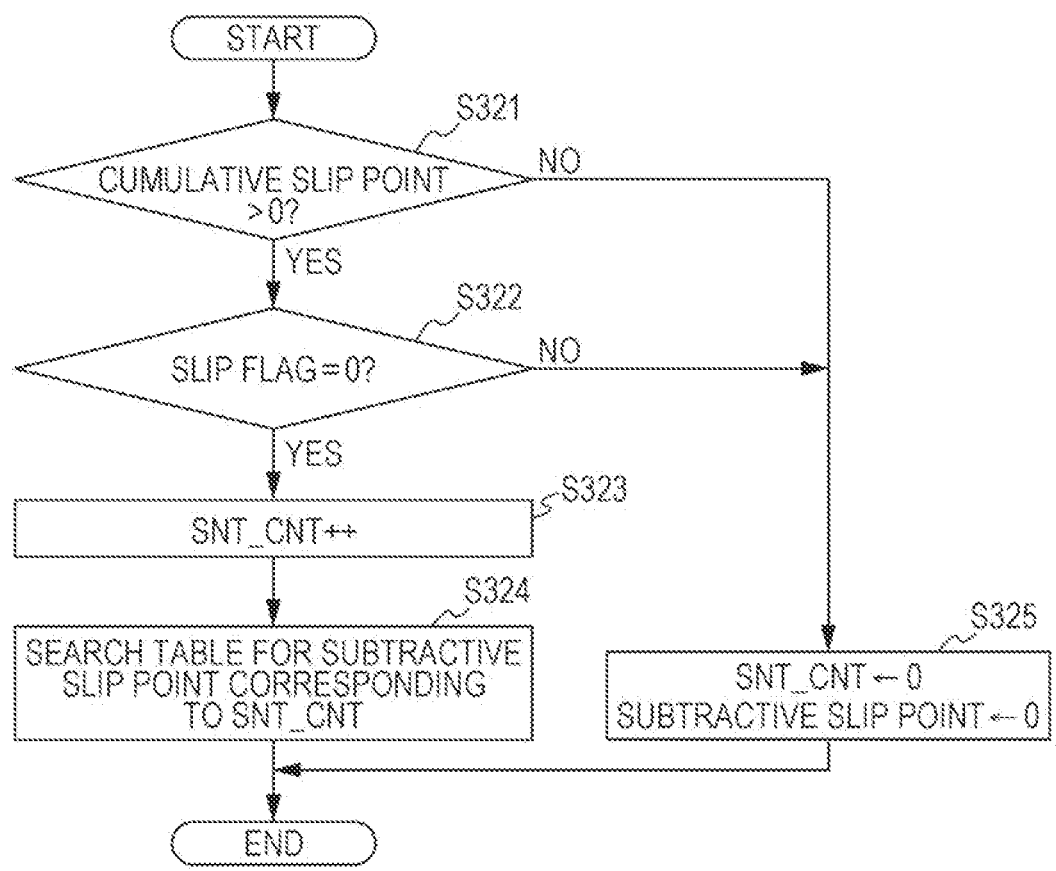
FIG. 13 is a flowchart representing a process for calculating a time subtractive slip point according to the embodiment.

FIG. 13 is a flowchart representing the process for calculating the time subtractive slip point according to the present embodiment. In step S321, whether or not the cumulative slip point is greater than 0 is determined. If the determination is "YES", which means that the cumulative slip point has accumulated, the process proceeds to step S322. If the determination is "NO", which means that the cumulative slip point has not accumulated, the non-slip duration counter SNT_CNT is reset to 0 and the subtractive slip point is set to 0 in step S325, and the process is finished. Thus, when the cumulative slip point is 0, the subtractive slip point is calculated only as 0. Therefore, the cumulative slip point does not become negative.

In step S322, whether or not the slip flag is "0" is determined. If the determination is "YES", the non-slip duration counter SNT_CNT is incremented in step S323, and the process proceeds to step S324. If the determination is "NO", the non-slip duration counter SNT_CNT is reset to 0 and the subtractive slip point is set to 0 in step S325, and the process is finished.

In step S324, a table is searched for a subtractive slip point corresponding to the non-slip duration counter SNT_CNT, which has been incremented in step S323, and the process is finished. To be specific, the time subtractive slip point is calculated by searching a time subtractive slip point table, which has been made and stored in advance in the non-slip duration subtractor 692, in accordance with the non-slip duration counter SNT_CNT (that is, the non-slip duration (sec)).

Figure 14:
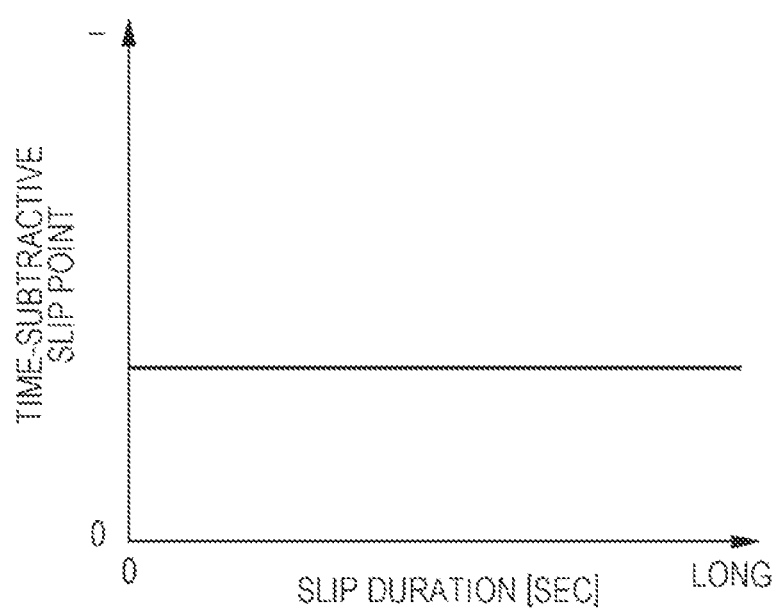
FIG. 14 is a diagram illustrating a time subtractive slip point table, which is stored in a non-slip duration subtractor according to the embodiment.

FIG. 14 is a diagram illustrating the time subtractive slip point table, which is stored in the non-slip duration subtractor 692. In FIG. 14, the horizontal axis represents the non-slip duration (sec), and the vertical axis represents the time subtractive slip point, which has a negative value. As illustrated in FIG. 14, the time subtractive slip point table is configured in such a way that the time subtractive slip point has a comparatively small constant absolute value for any non-slip duration. This is because it is necessary to gradually decrease the cumulative slip point as the non-slip duration increases.

Figure 15:
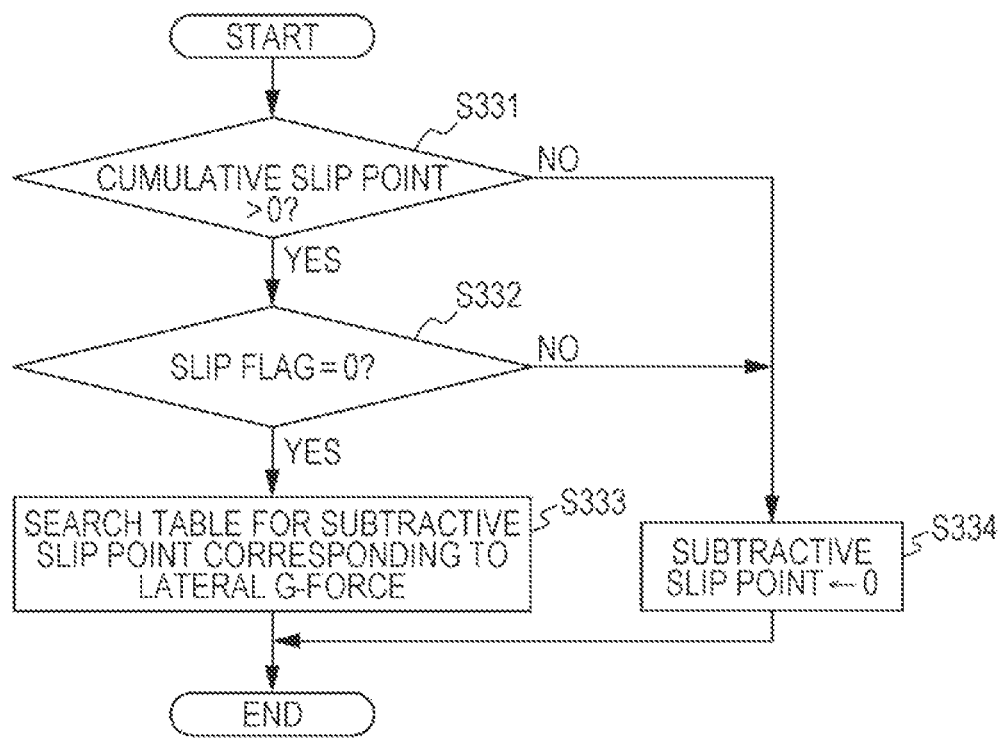
FIG. 15 is a flowchart representing a process for calculating a lateral G subtractive slip point according to the embodiment.

FIG. 15 is a flowchart representing the process for calculating the lateral G subtractive slip point according to the present embodiment. In step S331, whether or not the cumulative slip point is greater than 0 is determined. If the determination is "YES", which means that the cumulative slip point has accumulated, the process proceeds to step S332. If the determination is "NO", which means that the cumulative slip point has not accumulated, the subtractive slip point is set to 0 in step S334, and the process is finished. Thus, when the cumulative slip point is 0, the subtractive slip point is calculated only as 0. Therefore, the cumulative slip point does not become negative.

In step S332, whether or not the slip flag is "0" is determined. If the determination is "YES", the process proceeds to step S333. If the determination is "NO", the subtractive slip point is set to 0 in step S334, and the process is finished.

In step S333, a table is searched for a subtractive slip point corresponding to the lateral G-force when slipping does not occur, and the process is finished. To be specific, the lateral G subtractive slip point is calculated by searching the lateral G subtractive slip point table, which has been made and stored in advance in the non-slip lateral G subtractor 693, in accordance with a lateral G-force when slipping does not occur.

Figure 16:
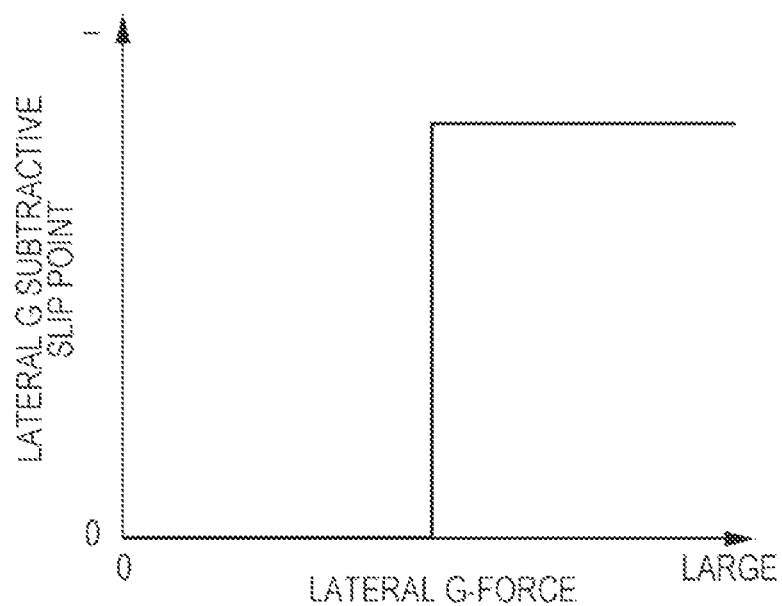
FIG. 16 is a diagram illustrating a lateral G subtractive slip point table, which is stored in a non-slip lateral G subtractor according to the embodiment.

FIG. 16 is a diagram illustrating the lateral G subtractive slip point table, which is stored in the non-slip lateral G subtractor 693. In FIG. 16, the horizontal axis represents the lateral G-force, and the vertical axis represents the lateral G subtractive slip point, which has a negative value. As illustrated in FIG. 16, the lateral G subtractive slip point table is configured in such a way that, if the lateral G-force when slipping does not occur is less than a predetermined value, the lateral G subtractive slip point is 0; and if the lateral G-force when slipping does not occur is greater than or equal to the predetermined value, the lateral G subtractive slip point has a comparatively large constant absolute value. This is because, in a case where slipping does not occur, a larger lateral G-force implies that the road surface has a relatively high coefficient of friction (μ), and therefore it is necessary to avoid switching to 2WD when the road surface has a low coefficient friction (μ) by setting a larger lateral G subtractive slip point for a larger lateral G-force.

Figure 17:
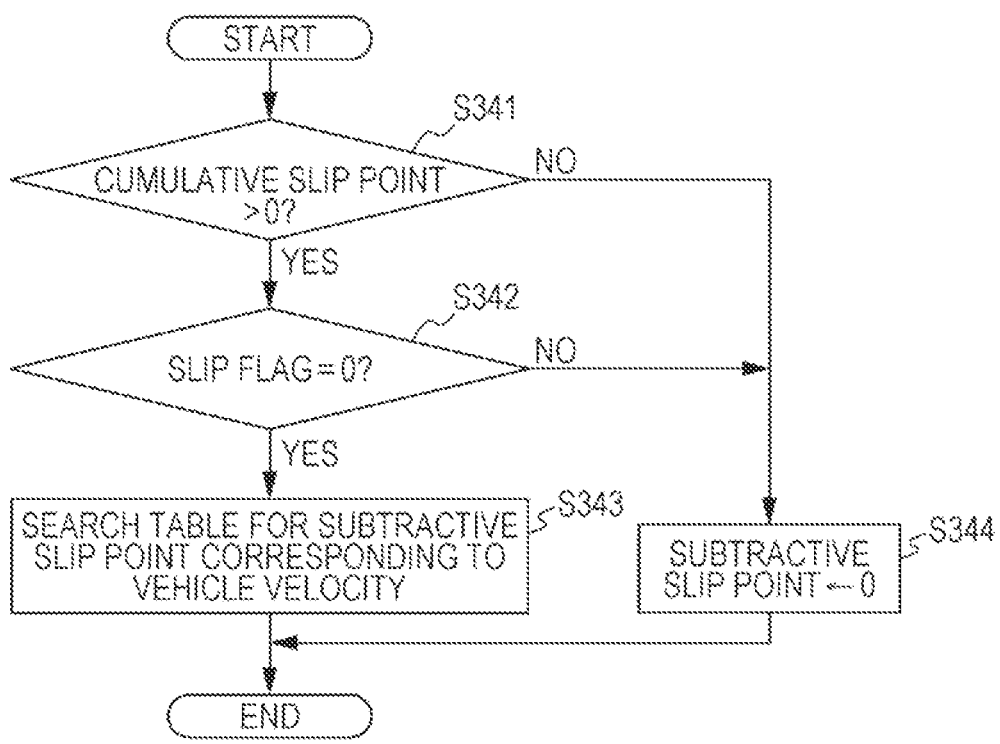
FIG. 17 is a flowchart representing a process for calculating a vehicle velocity subtractive slip point according to the embodiment.

FIG. 17 is a flowchart representing the process for calculating the vehicle velocity subtractive slip point according to the present embodiment. In step S341, whether or not the cumulative slip point is greater than 0 is determined. If the determination is "YES", which means that the cumulative slip point has accumulated, the process proceeds to step S342. If the determination is "NO", which means that the cumulative slip point has not accumulated, the subtractive slip point is set to 0 in step S344, and the process is finished. Thus, if the cumulative slip point is 0, the subtractive slip point is calculated only as 0. Therefore, the cumulative slip point does not become negative.

In step S342, whether or not the slip flag is "0" is determined. If the determination is "YES", the process proceeds to step S343. If the determination is "NO", the subtractive slip point is set to 0 in step S344, and the process is finished.

In step S343, a table is searched for a subtractive slip point corresponding to the vehicle velocity when slipping does not occur, and the process is finished. To be specific, the vehicle velocity subtractive slip point is calculated by searching the vehicle velocity subtractive slip point table, which has been made and stored in advance in the non-slip vehicle velocity subtractor 694, in accordance with a vehicle velocity when slipping does not occur.

Figure 18:
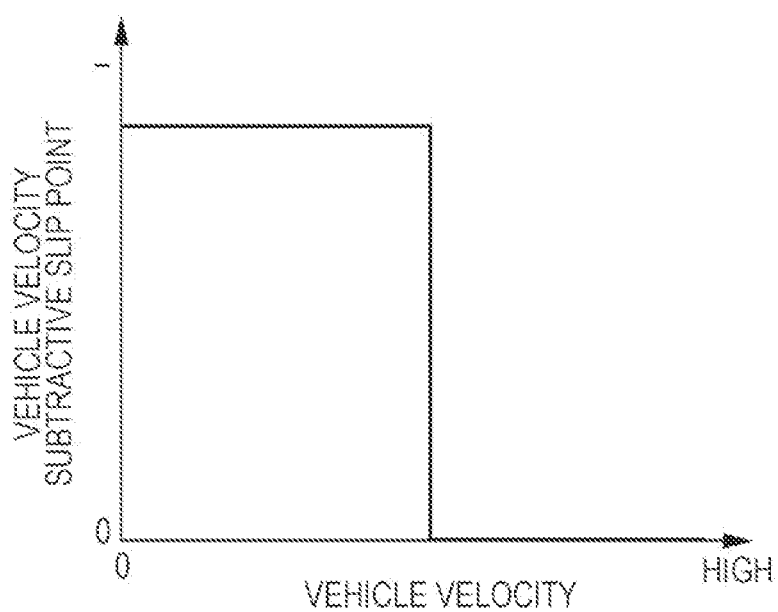
FIG. 18 is a diagram illustrating a vehicle velocity subtractive slip point table, which is stored in a non-slip vehicle velocity subtractor according to the embodiment.

FIG. 18 is a diagram illustrating the vehicle velocity subtractive slip point table, which is stored in the non-slip vehicle velocity subtractor 694. In FIG. 18, the horizontal axis represents the vehicle velocity, and the vertical axis represents the vehicle velocity subtractive slip point, which has a negative value. As illustrated in FIG. 18, the vehicle velocity subtractive slip point table is configured in such a way that, if the vehicle velocity when slipping does not occur is less than a predetermined value, the vehicle velocity subtractive slip point has a comparatively large constant absolute value; and if the vehicle velocity when slipping does not occur is greater than or equal to the predetermined value, the vehicle velocity subtractive slip point is 0. This is because, when the vehicle velocity is less than the predetermined value, movement of the vehicle does not become considerably unstable even if slipping occurs, and therefore it is possible to perform switching from AWD to 2WD at a more appropriate timing by setting the absolute value of the vehicle velocity subtractive slip point to be a comparatively large constant absolute value for a low vehicle velocity and setting the vehicle velocity subtractive slip point is set to 0 for a high vehicle velocity.

Figure 19:
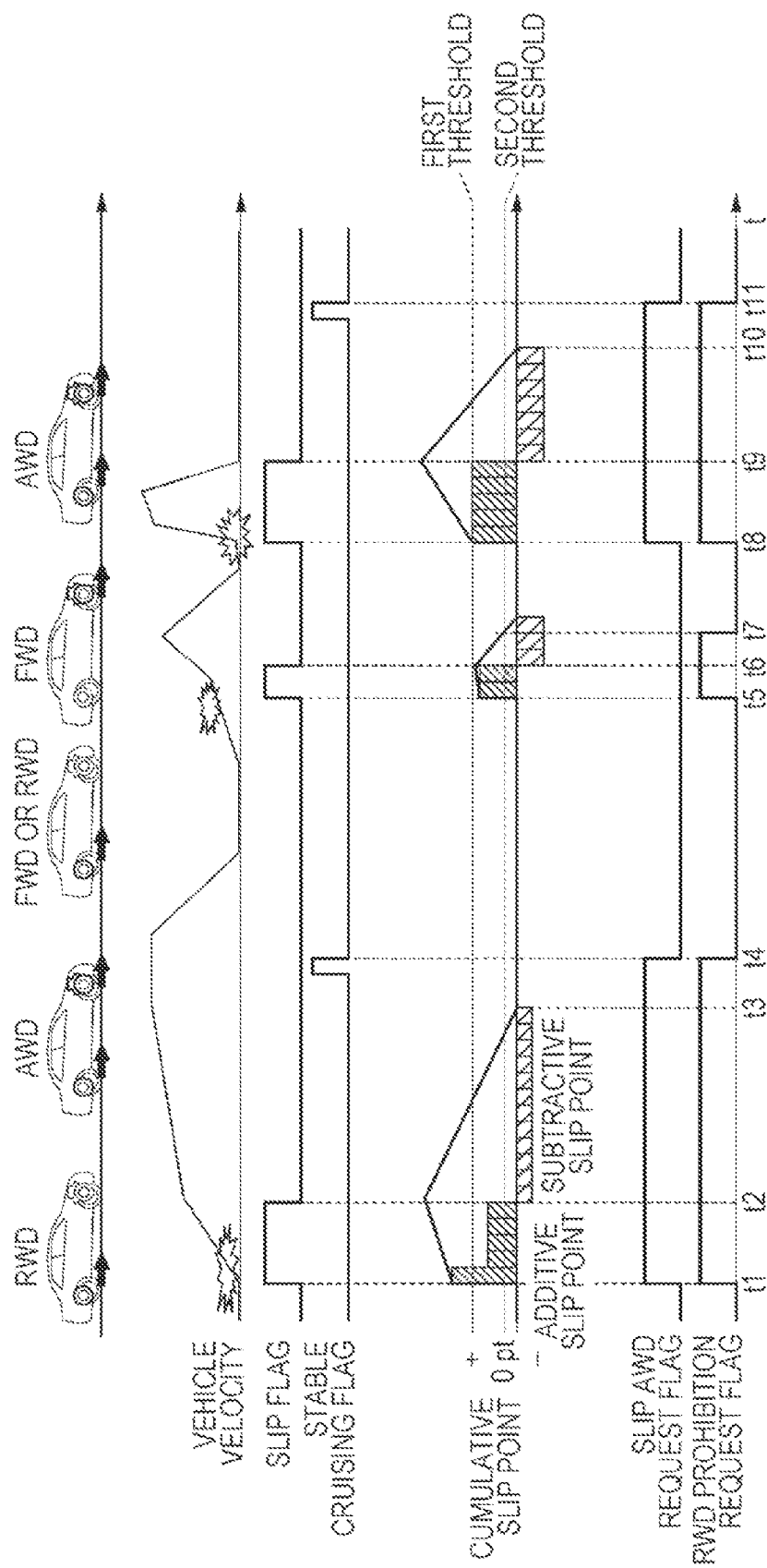
FIG. 19 is a timing chart illustrating an example of driving mode switching control according to the embodiment.

Next, an example of driving mode switching control according to the present embodiment will be described, in reference to FIG. 19. FIG. 19 is a timing chart illustrating the example of driving mode switching control according to the present embodiment. In the graph of "cumulative slip point" in FIG. 19, bars protruding on the positive side (upward in FIG. 19) represent additive slip points, and bars protruding on the negative side (downward in FIG. 19) represent subtractive slip points, and the line chart represents the cumulative slip point.

First, the vehicle is started in RWD mode, which can be an electric only (EV) mode if the rear wheels are driven by an electrical driving device, such as a driving device including one or more electric motors. At time t1, an occurrence of slipping is detected and the slip flag is set to "1", and calculation of the additive slip point is started. At this time, because slipping has occurred when the driving force is small (that is, the additive slip point is large as illustrated in FIG. 9), the calculated value of the additive slip point is large. Therefore, the cumulative slip point, which is the cumulative sum of the additive slip points, is at or above the first threshold. Accordingly, the slip AWD request flag is set to "1", and the driving mode is switched to AWD. At the same time, because the cumulative slip point is at or above the second threshold, which is smaller than the first threshold, the RWD prohibition request flag is set to "1".

Calculation of the additive slip point is continued until time t2, at which the slip flag is set to "0". Between time t1 and time t2, the additive slip points having positive values are calculated on the basis of slip duration and accumulated, so that the cumulative slip point increases.

At time t2, an occurrence of slipping is not detected, and therefore the slip flag is set to "0". Accordingly, calculation of the additive slip point is stopped, and calculation of the subtractive slip point is started. At this time, because the vehicle velocity is high (that is, the subtractive slip point is small as illustrated in FIG. 18) and the driving force is low (that is, the subtractive slip point is small as illustrated in FIG. 12), the calculated value of the subtractive slip point is small.

Calculation of the subtractive slip point is continued until time t3, at which the cumulative slip point becomes 0. Between time t2 and time t3, the subtractive slip points having negative values are calculated on the basis of the non-slip duration and accumulated, so that the cumulative slip point decreases. At time t3, the cumulative slip point is already below the first threshold. However, because the stable cruising flag is "0", the slip AWD request flag is still "1" and the AWD driving mode is maintained.

At time t4, the cumulative slip point is below the first threshold, and the stable cruising flag is "1". Accordingly, the slip AWD request flag is set to "0". Moreover, because the cumulative slip point is below the second threshold, the RWD prohibition request flag is set to "0". Thus, switching from AWD to FWD or RWD can be performed. Driving mode switching control can be configured such that the RWD prohibition request does not set to "0" at t3 since the stable cruising flag is still "0" (indicating absence of a stable cruising state) at t3.

At time t5, an occurrence of slipping is detected again, and the slip flag is set to "1". Accordingly, calculation of the additive slip point is started. At this time, because slipping has occurred when the driving force is large (that is, the additive slip point is small as illustrated in FIG. 9), the calculated value of the additive slip point is small. Therefore, because the cumulative slip point, which is the cumulative sum of the additive slip points, is below the first threshold, the slip AWD request flag is still "0". On the other hand, because the cumulative slip point is at or above the second threshold, the RWD prohibition request flag is set to "1" and switching to RWD is prohibited. Thus, if the driving mode has been RWD before time t5, the driving mode is switched to FWD.

At time t6, an occurrence of slipping is not detected and the slip flag is set to "0". Accordingly, calculation of the additive slip point is stopped, and calculation of the subtractive slip point is started. At this time, because the vehicle velocity is high (that is, the subtractive slip point is small as illustrated in FIG. 18) and the driving force is large (that is, the subtractive slip point is large as illustrated in FIG. 12), the calculated value of the subtractive slip point is large. Because the cumulative slip point is below the first threshold, the slip AWD request flag is still "0".

At time t7, because the cumulative slip point is below the second threshold, the RWD-prohibition request flag is set to "0", and switching to FWD or RWD is performed.

At time t8, an occurrence of slipping is detected again, and the slip flag is set to "1". Accordingly, calculation of the additive slip point is started. At this time, because slipping has occurred when the driving force is small (that is, the additive slip point is large as illustrated in FIG. 9), the calculated value of the additive slip point is large. Therefore, the cumulative slip point, which is the cumulative sum of the additive slip points, is at or above the first threshold. Accordingly, the slip AWD request flag is set to "1", and the driving mode is switched to AWD. At the same time, because the cumulative slip point is at or above the second threshold, which is less than the first threshold, the RWD-prohibition request flag is set to "1".

At time t9, an occurrence of slipping is not detected, and the slip flag is set to "0". Accordingly, calculation of the additive slip point is stopped, and calculation of the subtractive slip point is started. At this time, because slipping has not occurred when the vehicle velocity is low (that is, the subtractive slip point is large as illustrated in FIG. 18) and the driving force is small (that is, the subtractive slip point is small as illustrated in FIG. 12), the calculated value of the subtractive slip point is large.

Calculation of the subtractive slip point is continued until time t10, at which the cumulative slip point becomes 0. Between time t9 to time t10, the calculated subtractive slip points are accumulated, so that the cumulative slip point decreases. At time t10, the cumulative slip point is already below the first threshold. However, because the stable cruising flag is "0", the slip AWD request flag is still "1", and the AWD driving mode is maintained.

At time t11, the cumulative slip point is below the first threshold, while the stable cruising flag is "1". Accordingly, the slip AWD request flag is set to "0". Because the cumulative slip point is below the second threshold, the RWD-prohibition request flag is set to "0". Thus, switching to FWD or RWD is performed. Driving mode switching control can be configured such that, when the cumulative slip point goes over first threshold, the RWD prohibition request loses the ability to set the flag to "0" without permission of the stable cruising flag. In such an embodiment, the RWD prohibition request does not go to 0 until t11 at which time the stable cruising flag is set to 1 to indicate a stable cruising state. Since the cumulative slip point does not go over first threshold between t5 to t7, the RWD prohibition request is set to 0 at t7.

The present embodiment has the following advantages. With the present embodiment, the additive slip point is calculated on the basis of a driving force correlation value that correlates to the driving force of a driving wheel for which slipping has occurred. Then, the driving mode is switched between the two-wheel driving mode (2WD) and the all-wheel driving mode (AWD) on the basis of the cumulative slip point, which is the cumulative sum of the calculated additive/subtractive slip points. Thus, the driving mode is switched on the basis of the driving force of a driving wheel for which slipping has occurred. As a result, the driving mode of the vehicle 3 can be switched more efficiently. For example, in a case where the slipping amounts are the same, it is more likely that the road surface on which slipping occurs when the driving force is smaller has a lower coefficient of friction ($\mu$). With the present embodiment, the driving mode can be switched in accordance with the driving force when slipping occurs. Therefore, the driving mode can be prevented from being switched from AWD to 2WD when the road surface has a low coefficient of friction ($\mu$) and AWD is necessary, and therefore vehicle stability can be ensured. In a case where the slipping amounts are the same, it is more likely that the road surface on which slipping occurs when the driving force is larger has a higher coefficient of friction ($\mu$). With the present embodiment, the driving mode can be switched in accordance with the driving force of a driving wheel for which slipping has occurred. Therefore, the driving mode can be prevented from being switched from 2WD to AWD when the road surface has a high coefficient of friction ($\mu$) and AWD is not necessary. Moreover, AWD can be prevented from continuing for an unnecessarily long time, and therefore the driving efficiency can be improved. Furthermore, with the present embodiment, because the point system is used to control switching of the driving mode of the vehicle 3, different physical quantities (such as the slipping amount, the driving force, the time, and the like) can be converted into comparable values and controlled.

With the present embodiment, the driving mode of the vehicle 3 is switched to the two-wheel driving mode (2WD) when the cumulative slip point is below the first threshold and to the all-wheel driving mode (AWD) when the cumulative slip point is at or above the first threshold. In general, the stability of a vehicle increases in the order of 2WD and AWD, while the driving efficiency (fuel economy and electricity-use economy) of a vehicle decreases in this order. With the present embodiment, the driving mode can be switched between 2WD and AWD at a more appropriate timing. Therefore, a higher vehicle stability can be ensured and decrease in the driving efficiency can be more effectively suppressed.

With the present embodiment, the driving mode of the vehicle 3 is switched to the rear-wheel driving mode (RWD) when the cumulative slip point is below the second threshold, to the front-wheel driving mode (FWD) when the cumulative slip point is at or above the second threshold, and to the all-wheel driving mode (AWD) when the cumulative slip point is greater than or equal to the first threshold, which is greater than the second threshold. In general, the stability of a vehicle increases in the order of RWD, FWD, and AWD; while the driving efficiency (fuel economy and electricity-use economy) of a vehicle decreases in the order of 2WD (RWD or FWD) and AWD. With the present embodiment, the driving mode can be switched among RWD, FWD, and AWD at a more appropriate timing. Therefore, a higher vehicle stability can be ensured, and decrease in the driving efficiency can be more effectively suppressed.

In the present embodiment, the first driving device 1 includes the internal combustion engine 4 as a drive source, and the second driving device 2 includes only the electric motors 2A and 2B as drive sources. That is, at least the internal combustion engine 4 is provided as a drive source for the front wheels Wf (LWf and RWf), and only the electric motors 2A and 2B are provided as driving sources for the rear wheels Wr (RWr and LWr). The driving efficiency of the vehicle 3 may decrease in the order of RWD, FWD, and AWD. With the present embodiment, the driving mode can be switched among RWD, FWD, and AWD at a more appropriate timing to increase overall driving efficiency. Therefore, a higher vehicle stability can be ensured, and decrease in the driving efficiency can be more effectively suppressed.

In another embodiment, a vehicle driving system the vehicle driving system 10 includes a vehicle driving switcher where, when the cumulative slip point is at or above the first threshold, the 2WD-prohibition-request flag is set to "1", and switching to the two-wheel driving mode (2WD), that is, the front-wheel driving mode (FWD) and the rear-wheel driving mode (RWD), is prohibited. Thus, the driving mode of the vehicle 3 becomes the all-wheel driving mode (AWD). With the driving mode switcher according to the present embodiment, the 2WD-prohibition-request flag is set to "0" when the cumulative slip point is below the first threshold and the stable cruising flag is "1", so that switching to the two-wheel driving mode (2WD), that is, the front-wheel driving mode (FWD) and the rear-wheel driving mode (RWD), is allowed. Thus, switching to the front-wheel driving mode (FWD) or the rear-wheel driving mode (RWD) is performed.

With the driving mode switcher according to the present embodiment, as with the driving mode switcher 64 according to the first embodiment, the RWD-prohibition request flag is set to "1" when the cumulative slip point is at or above the second threshold, and the driving mode of the vehicle 3 is switched to the front-wheel driving mode (FWD). When the cumulative slip point is below the second threshold, which is less than the first threshold, the RWD-prohibition request flag is set to "0", and the driving mode of the vehicle 3 is switched to the rear-wheel driving mode (RWD).

Figure 20:
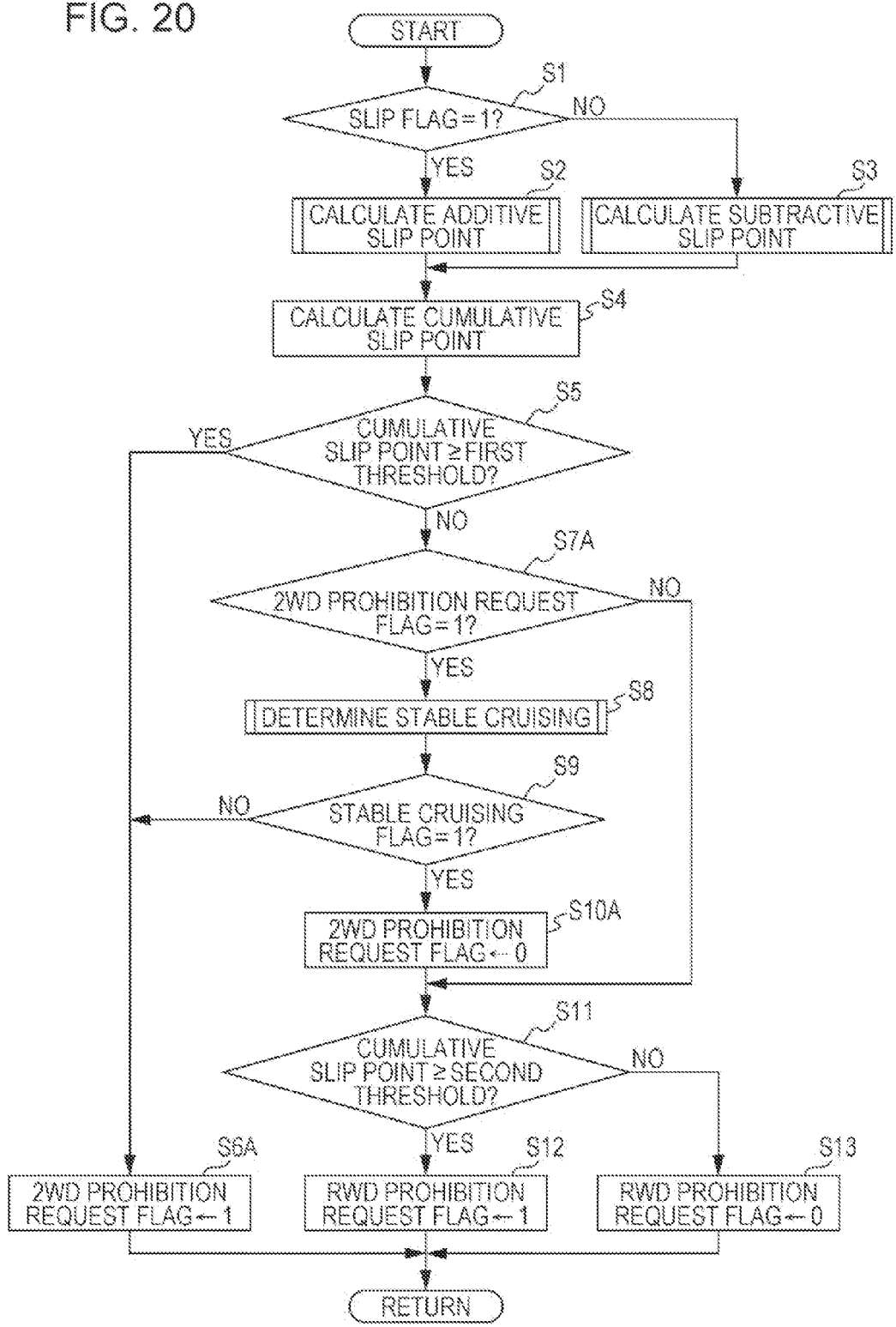
FIG. 20 is a flowchart representing a process for controlling switching of a driving mode according to a second embodiment of the present disclosure.

FIG. 20 is a flowchart of a driving mode switching control process according to the present embodiment. This control process is repeatedly performed by the ECU 6. The driving mode switching control according to the present embodiment is the same as the driving mode switching control according to the first embodiment, except that steps S6, S7, and S10 are replaced with steps S6A, S7A, and S10A.

If it is determined that the cumulative slip point is at or above the first threshold in step S5, the 2WD-prohibition-request flag is set to "1" in step S6A, and the process is finished. Thus, switching to the two-wheel driving mode (2WD), that is, the front-wheel driving mode (FWD) and the rear-wheel driving mode (RWD), is prohibited, and the driving mode of the vehicle 3 becomes the all-wheel driving mode (AWD).

If it is determined that the cumulative slip point is below the first threshold in step S5, whether or not the 2WD-prohibition-request flag is "1" is determined in step S7A.

If it is determined that the stable cruising flag is "1" in step S9, the 2WD-prohibition-request flag is set to "0" in step S10A. Thus, switching to the front-wheel driving mode (FWD) and the rear-wheel driving mode (RWD) is allowed, and the driving mode is switched to the front-wheel driving mode (FWD) or the rear-wheel driving mode (RWD).

The present embodiment has advantages the same as those of the first embodiment. To be specific, with the present embodiment, switching to the two-wheel driving mode (2WD) is prohibited when the cumulative slip point is at or above the first threshold. Thus, switching to 2WD can be prohibited at a more appropriate timing, so that a higher vehicle stability can be ensured.

With the present embodiment, switching to the front-wheel driving mode (FWD) and the rear-wheel driving mode (RWD) is prohibited when the cumulative slip point is at or above the first threshold, and switching to the rear-wheel driving mode (RWD) is prohibited when the cumulative slip point is at or above the second threshold. As described above, in general, vehicle stability of a vehicle increases in the order of RWD, FWD, and AWD, while the driving efficiency of the vehicle decreases in the order of 2WD (RWD, FWD) and AWD. With the present embodiment, switching to FWD and RWD can be prohibited at a more appropriate timing, so that a higher vehicle stability can be ensured and decrease in the driving efficiency can be more effectively suppressed.

The present disclosure is not limited to the embodiments described above, and modifications and improvements within the scope of the present disclosure are included in the present disclosure and in light of the above teachings. Some of those modifications have been discussed and others will be understood by those skilled in the art. For example, the additive/subtractive slip point calculator 62 in the embodiments may be changed to an additive slip point calculator that calculates the additive slip point but does not calculate the subtractive slip point. In this case, the driving mode may be switched from the two-wheel driving mode (2WD) to the all-wheel driving mode (AWD) on the basis of the cumulative slip point, which is the cumulative sum of the additive slip points; and switching from the all-wheel driving mode (AWD) to the two-wheel driving mode (2WD) may be performed when, for example, a predetermined time elapses, without using the point system.

In the embodiments described above, the drive source of the rear wheel includes only the electric motors 2A and 2B. Alternatively, the drive source of the rear wheel may include an engine. In the embodiments described above, the second driving device 2 for driving the rear wheels includes the two electric motors 2A and 2B. Alternatively, the second driving device 2 may include only one motor.

The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. A vehicle driving system comprising:
   a first driving device that drives a first driving wheel that is one of a front wheel and a rear wheel of a vehicle;
   a second driving device that drives a second driving wheel that is the other of the front wheel and the rear wheel of the vehicle; and
   a controller that controls the first driving device and the second driving device so as to control a driving mode of the first driving wheel and the second driving wheel, the controller including
      a slip detector that detects an occurrence of excess slipping of the first driving wheel or the second driving wheel, the excess slipping being slipping of more than a predetermined amount,
      an additive/subtractive slip point calculator unit that time-discretely calculates an additive/subtractive slip point on the basis of detection or non-detection of the occurrence of the excess slipping by the slip detector, the additive/subtractive slip point being an additive slip point or a subtractive slip point,
      a cumulative slip point calculator that sequentially calculates a cumulative slip point that is a cumulative sum of values of the additive/subtractive slip point, and
      a driving mode switcher that switches between a two-wheel driving mode and an all-wheel driving mode on the basis of the cumulative slip point, the two-wheel driving mode being a driving mode in which only one of the first driving wheel and the second driving wheel is used to drive the vehicle, the all-wheel driving mode being a driving mode in which both the first driving wheel and the second driving wheel are used to drive the vehicle,
   wherein, when the slip detector detects the occurrence of the excess slipping, the additive/subtractive slip point calculator calculates the additive slip point on the basis of a driving force correlation value that correlates to a driving force of a driving wheel for which the excess slipping has occurred.

2. The vehicle driving system according to claim 1, wherein the driving mode switcher switches to the two-wheel driving mode when the cumulative slip point is below a first threshold and to the all-wheel driving mode when the cumulative slip point is at or above the first threshold.

3. The vehicle driving system according to claim 1,
wherein the driving mode switcher prohibits switching to the two-wheel driving mode when the cumulative slip point is at or above a first threshold.

4. The vehicle driving system according to claim 1,
wherein, in a case where the front wheel is the first driving wheel and the rear wheel is the second driving wheel,
the driving mode switcher switches, on the basis of the cumulative slip point, among a front-wheel driving mode in which only the front wheel is used to drive the vehicle, a rear-wheel driving mode in which only the rear wheel is used to drive the vehicle, and an all-wheel driving mode in which both the front wheel and the rear wheel are used to drive the vehicle, and
the driving mode switcher switches to the rear-wheel driving mode when the cumulative slip point is below a second threshold, to the front-wheel driving modes when the cumulative slip point is at or above the second threshold, and to the all-wheel driving mode when the cumulative slip point is at or above a first threshold that is greater than the second threshold.

5. The vehicle driving system according to claim 3,
wherein, in a case where the front wheel is the first driving wheel and the rear wheel is the second driving wheel,
the driving mode switcher switches, on the basis of the cumulative slip point, among a front-wheel driving mode in which only the front wheel is used to drive the vehicle, a rear-wheel driving mode in which only the rear wheel is used to drive the vehicle, and an all-wheel driving mode in which both the front wheel and the rear wheel are used to drive the vehicle, and
the driving mode switcher prohibits switching to the front-wheel driving mode and the rear-wheel driving mode when the cumulative slip point is at or above the first threshold, and prohibits switching to the rear-wheel driving mode when the cumulative slip point is at or above a second threshold that is less than the first threshold.

6. The vehicle driving system according to claim 1,
wherein the first driving device includes an internal combustion engine as a drive source, and
wherein the second driving device includes only an electric motor as a drive source.

7. A vehicle driving system comprising:
a first driving device that drives a first driving wheel that is one of a front wheel and a rear wheel of a vehicle;
a second driving device that drives a second driving wheel that is the other of the front wheel and the rear wheel of the vehicle; and
a controller that controls the first driving device and the second driving device so as to control a driving mode of the first driving wheel and the second driving wheel, the controller including
a slip detector that detects an occurrence of excess slipping of the first driving wheel or the second driving wheel, the excess slipping being slipping of more than a predetermined amount,
an additive slip point calculator that time-discretely calculates an additive slip point on the basis of detection of the occurrence of the excess slipping by the slip detector,
a cumulative slip point calculator that sequentially calculates a cumulative slip point that is a cumulative sum of values of the additive slip point, and
a driving mode switcher that switches between a two-wheel driving mode and an all-wheel driving mode on the basis of the cumulative slip point, the two-wheel driving mode being a driving mode in which only one of the first driving wheel and the second driving wheel is used to drive the vehicle, the all-wheel driving mode being a driving mode in which both the first driving wheel and the second driving wheel are used to drive the vehicle,
wherein, when the slip detector detects the occurrence of the excess slipping, the additive slip point calculator calculates the additive slip point on the basis of a driving force correlation value that correlates to a driving force of a driving wheel for which the excess slipping has occurred.

8. The vehicle driving system according to claim 7,
wherein the driving mode switcher switches to the two-wheel driving mode when the cumulative slip point is below a first threshold and to the all-wheel driving mode when the cumulative slip point is at or above the first threshold.

9. The vehicle driving system according to claim 7,
wherein the driving mode switcher prohibits switching to the two-wheel driving mode when the cumulative slip point is at or above a first threshold.

10. The vehicle driving system according to claim 7,
wherein, in a case where the front wheel is the first driving wheel and the rear wheel is the second driving wheel,
the driving mode switcher switches, on the basis of the cumulative slip point, among a front-wheel driving mode in which only the front wheel is used to drive the vehicle, a rear-wheel driving mode in which only the rear wheel is used to drive the vehicle, and an all-wheel driving mode in which both the front wheel and the rear wheel are used to drive the vehicle, and
the driving mode switcher switches to the rear-wheel driving mode when the cumulative slip point is below a second threshold, to the front-wheel driving modes when the cumulative slip point is at or above the second threshold, and to the all-wheel driving mode when the cumulative slip point is at or above a first threshold that is greater than the second threshold.

11. The vehicle driving system according to claim 9,
wherein, in a case where the front wheel is the first driving wheel and the rear wheel is the second driving wheel,
the driving mode switcher switches, on the basis of the cumulative slip point, among a front-wheel driving mode in which only the front wheel is used to drive the vehicle, a rear-wheel driving mode in which only the rear wheel is used to drive the vehicle, and an all-wheel driving mode in which both the front wheel and the rear wheel are used to drive the vehicle, and
the driving mode switcher prohibits switching to the front-wheel driving mode and the rear-wheel driving mode when the cumulative slip point is at or above the first threshold, and prohibits switching to the rear-wheel driving mode when the cumulative slip point is at or above a second threshold that is less than the first threshold.

12. The vehicle driving system according to claim 10,
wherein the first driving device includes an internal combustion engine as a drive source, and
wherein the second driving device includes only an electric motor as a drive source.

13. A method of controlling a driving mode of a vehicle comprising the steps of:
detecting a plurality of occurrences of excess slipping in a first driving wheel of a vehicle;
calculating a plurality of additive/subtractive slip points;

calculating a cumulative slipping point that is a sum of the plurality of additive/subtractive slip points; and applying torque to a second driving wheel based on the cumulative slipping point.

14. The method of claim 13, wherein the step of detecting a plurality of occurrences of excess slipping in a first driving wheel comprises comparing a velocity of the first driving wheel to a velocity of another wheel on the vehicle.

15. The method of claim 13, wherein the first driving wheel is one of a front and rear wheel of the vehicle and the second driving wheel is the other of the front and rear wheel of the vehicle.

16. The method of claim 13, wherein the step of calculating each said additive/subtractive slip point on the basis of the detecting the occurrence of the excess slipping in the driving wheel comprises measuring a driving force and a slip duration.

17. The method of claim 16 wherein the step of measuring a driving force comprises estimating the driving force based on a detected value selected from the group consisting of: an accelerator position detected by an accelerator sensor; an engine revolution detected by an engine revolution sensor; and motor currents detected by a motor current sensor.

18. The method of claim 13, wherein the step of calculating a plurality of additive/subtractive slip points comprises calculating each additive/subtractive slip point on the basis of a driving force correlation value that correlates to a driving force of a driving wheel for which the excess slipping has occurred.

19. The method of claim 13 wherein the step of applying torque to a second driving wheel based on the cumulative slipping point comprises determining whether the cumulative slipping point is greater than a first threshold and greater than a second threshold, wherein when the cumulative slipping point is greater than the first threshold, an all-wheel-drive mode is capable of being activated and when the cumulative slipping point is greater than the second threshold, a front-wheel-drive mode is capable of being activated.

20. A method of claim 13, wherein the step of calculating a plurality of additive/subtractive slips points comprises time-discretely calculating an additive/subtractive slip point on the basis of detection or non-detection of the occurrence of the excess slipping, the additive/subtractive slip point being an additive slip point or a subtractive slip point; and wherein the step of calculating a cumulative slipping point that is a sum of the plurality of additive/subtractive slip points comprises sequentially calculating a cumulative slip point that is a cumulative sum of values of the additive/subtractive slip points.

* * * * *